United States Patent
Kurian et al.

(10) Patent No.: US 9,680,835 B1
(45) Date of Patent: Jun. 13, 2017

(54) PROACTIVE INTRUSION PROTECTION SYSTEM

(71) Applicant: Bank of America Corporation, Charlotte, NC (US)

(72) Inventors: Manu J. Kurian, Dallas, TX (US); David N. Hillis, Goodyear, AZ (US)

(73) Assignee: Bank of America Corporation, Charlotte, NC (US)

( * ) Notice: Subject to any disclaimer, the term of this patent is extended or adjusted under 35 U.S.C. 154(b) by 66 days.

(21) Appl. No.: 14/950,799

(22) Filed: Nov. 24, 2015

(51) Int. Cl.
*H04M 3/16* (2006.01)
*H04L 29/06* (2006.01)
*H04L 29/08* (2006.01)
*H04W 48/02* (2009.01)

(52) U.S. Cl.
CPC .............. *H04L 63/10* (2013.01); *H04L 67/30* (2013.01); *H04W 48/02* (2013.01)

(58) Field of Classification Search
CPC ......... H04L 63/00; H04L 67/30; H04W 48/02
USPC .......................................................... 455/411
See application file for complete search history.

(56) References Cited

U.S. PATENT DOCUMENTS

| 6,311,055 B1* | 10/2001 | Boltz | H04M 1/66 379/196 |
| 7,142,848 B2* | 11/2006 | Owen | H04W 24/02 455/418 |
| 2007/0143422 A1* | 6/2007 | Cai | H04M 3/436 709/206 |
| 2011/0294478 A1* | 12/2011 | Trivi | H04M 3/436 455/415 |
| 2014/0128047 A1* | 5/2014 | Edwards | H04L 51/12 455/415 |

(Continued)

FOREIGN PATENT DOCUMENTS

| KR | 1020100136709 | 12/2010 |
| KR | 1020110048825 | 5/2011 |
| KR | 1020110082366 | 7/2011 |

(Continued)

OTHER PUBLICATIONS

Manu J. Kurian, Proactive Intrusion Protection System, U.S. Appl. No. 14/950,956, filed Nov. 24, 2015.

(Continued)

*Primary Examiner* — William Nealon
(74) *Attorney, Agent, or Firm* — Michael A. Springs

(57) ABSTRACT

A system for proactive intrusion protection comprises a memory operable to store data identifying a plurality of compromising entities, comprising at least one of a device identifier or a contact identifier, and a processor communicatively coupled to the memory and operable to receive, from a remote application associated with a remote device and with the system, information regarding a source of the incoming communication. The processor is further operable to determine an entity associated with the source of the incoming communication and to determine that the entity associated with the source matches at least one of the plurality of compromising entities based on comparing the data identifying the plurality of compromising entities and the entity associated with the source of the incoming communication. Furthermore, the processor is operable to send to the remote application a signal configured to block the incoming communication.

17 Claims, 6 Drawing Sheets

(56) References Cited

U.S. PATENT DOCUMENTS

2014/0344153 A1* 11/2014 Raj ................... G06Q 20/3821
                                                    705/44
2015/0156300 A1*  6/2015 Park .................... H04M 1/663
                                                   455/414.1

FOREIGN PATENT DOCUMENTS

| KR | 101059558    | 8/2011  |
|----|--------------|---------|
| KR | 1020120012307| 2/2012  |
| KR | 1020120061022| 6/2012  |
| KR | 1020120089388| 8/2012  |
| KR | 101206086    | 11/2012 |
| KR | 101246624    | 3/2013  |
| KR | 1020130049102| 5/2013  |
| KR | 101364763    | 2/2014  |
| KR | 1020140077094| 6/2014  |
| KR | 101427754    | 8/2014  |
| KR | 101431596    | 8/2014  |
| KR | 101460220    | 11/2014 |

OTHER PUBLICATIONS

Manu J. Kurian, Proactive Intrusion Protection System, U.S. Appl. No. 14/950,855, filed Nov. 24, 2015.
David N. Hillis, Proactive Intrusion Protection System, U.S. Appl. No. 14/950,891, filed Nov. 24, 2015.

* cited by examiner

| DATE | EVENT ID | ENTITY IDENTIFIER | LOCATION | ADDITIONAL INFORMATION |
|---|---|---|---|---|
| 10/1/2015 | 1111 | [PHONE NO.] | [Location A] | - Number claims to be from Bank A<br>- All account holders to call |
| 10/5/2015 | 1112 | [NAME] | [Location B] | - Posing as fraud rep. for Bank B |
| 11/6/2015 | 1113 | [EMAIL ADDRESS] | [Location C] | - Seeking SMS containing acct. login info. |
| 11/7/2015 | 1114 | [DOMAIN NAME] | [Location D] | - Offering fake credit card from Bank C<br>- Seeking SSN and personal info. |

FIG. 2

PROACTIVE INTRUSION PROTECTION SYSTEM

TECHNICAL FIELD

The present disclosure relates generally to intrusion protection systems, and more particularly to proactive network intrusion protection systems that protect remote devices.

BACKGROUND

Users of various institutions, and networks associated with those institutions, can be susceptible to intrusions in a number of ways. Entities may contact or attempt to retrieve information from a remote device owned by the user in order to access that user's account with the various institutions. For example, an entity seeking to misappropriate a user's account may contact that user's mobile device by phone, email, SMS, or any other means in an attempt to elicit information from the user in order to access the user's account. In addition, such entities may attempt to improperly access and control the remote device in an attempt to access the user's account through the remote device. For example, the user may have an application installed on his mobile phone that allows the user to connect to a system associated with an institution. The connection between the remote device and the institution via the application may be a target for an entity that seeks to misappropriate the user's account with that institution.

Various names for these intrusion activities exist, including "phishing," "wishing," "pharming," "smishing," similar threats via social media, etc., as well as improperly obtaining the user's remote device and attempting to access the user's account. In addition, upon becoming aware of a general threat that may affect the user, the institution may reactively notify the user of the general threat, for example, by sending the user an SMS or email detailing the general threat. As another example, the institution may reactively notify the user of an actual intrusion against the user that already occurred.

SUMMARY OF EXAMPLE EMBODIMENTS

In accordance with the present disclosure, disadvantages and problems associated with intrusion protection systems may be reduced or eliminated, and one or more technical advantages may be realized.

According to particular embodiments of the present disclosure, a system comprises a memory and a processor. The memory is operable to store data identifying a plurality of compromising entities, where the data comprises at least one of a device identifier or a contact identifier. The processor is communicatively coupled to the memory and the processor is operable to receive, from a remote application associated with a remote device and with the system, information regarding an incoming communication, where the information comprises information regarding a source of the incoming communication. The processor is further operable to determine an entity associated with the source of the incoming communication by analyzing the information regarding the incoming communication. Furthermore, the processor is operable to determine that the entity associated with the source of the incoming communication matches at least one of the plurality of compromising entities based, at least in part, on comparing the data identifying the plurality of compromising entities and the entity associated with the source of the incoming communication. The processor is also operable to send, to the remote application associated with the system, a signal configured to block the incoming communication.

According to other particular embodiments of the present disclosure, a system comprises a memory and a processor. The memory is operable to store data identifying a plurality of compromising entities, where the data comprises at least one of a device identifier or a contact identifier. The processor is communicatively coupled to the memory and the processor is operable to receive, from a remote application associated with a remote device and with the system, information regarding an incoming communication, where the information comprises information regarding a source of the incoming communication. The processor is further operable to determine an entity associated with the source of the incoming communication by analyzing the information regarding the incoming communication. Furthermore, the processor is operable to determine that the entity associated with the source of the incoming communication matches at least one of the plurality of compromising entities based, at least in part, on comparing the data identifying the plurality of compromising entities and the entity associated with the source of the incoming communication. The processor is also operable to send, to the remote application associated with the system, an alert indicating that the source of the incoming communication matches a compromising entity.

Digital telecommunication networks and other computer networks are confronted with numerous security vulnerabilities inherent to computer networks. Often, communication and other networks are untrusted and vulnerable to entities seeking information associated with network users. These security vulnerabilities are further exacerbated when the networks are also used to communicate sensitive information, such as information regarding users' accounts with various institutions. For example, cellular, Internet (e.g., via WiFi), and other communication networks serving remote devices (e.g., mobile devices) are untrusted and vulnerable and can be accessed and/or used directly or indirectly by entities seeking to collect and/or request a user's sensitive information. In addition, the types of communications used on such networks, such as SMS, email, Internet communications, and others, are also inherently vulnerable to entities seeking to access or request a user's sensitive information. Not only are the types of communications vulnerable, but also users are vulnerable to incoming and outgoing communications using these same types of communications (e.g., telephone calls, MMS, or SMS to or from an entity seeking to misappropriate the user's information), particularly because the entities communicating with the user may be anonymous (which may include, for example, using a fake, seemingly legitimate identity). Ultimately, these network and communication vulnerabilities put users, and, in some cases, institutions, at risk of account intrusion (e.g., misappropriation), identity theft, and other malicious use of users' sensitive information, which could also cause negative regulatory, compliance, or monetary consequences. This disclosure focuses on various ways of increasing network security and reducing the scope and magnitude of certain present vulnerabilities of various computer networks.

Certain embodiments of the present disclosure may provide one or more technical advantages. For example, by sending an alert to a remote device before an outgoing communication is sent, e.g., in real time, the system increases the likelihood of preventing a user of the remote device from divulging data to the compromising entity that represents a potential intrusion threat. Similarly, sending an alert regarding incoming communications, which may also occur in real time, increases the likelihood of preventing intrusions. Compared to an institution sending out a general mass warning to users regarding potential intrusion threats, for example via email or SMS, a user using a remote device as described herein is more likely both to notice the security concern pertaining to the incoming and/or outgoing communication and to refrain from sending data to the compromising entity. The effectiveness of the system in preventing communications with compromising entities is further increased in situations where the system sends a signal to the remote device to block the remote device from establishing an outgoing communication with a compromising entity. Similarly, the system may send a signal to the remote device to block or quarantine incoming communications from compromising entities. By increasing the effectiveness of the intrusion protection system, digital telecommunication networks and the devices and hardware connected to them become more secure.

Furthermore, by transforming data regarding compromising entities into alerts and signals sent to the remote devices, the embodiments of the present disclosure may more effectively prevent intrusions into users' accounts, such as online bank accounts or credit accounts.

An additional technical advantage afforded by particular embodiments of the present invention is that intrusion protection can occur over communication channels that are more secure than standard email, SMS, MMS, Internet, etc., which may also increase the authenticity of communications. For example, communications between an application associated with an institution and a server (or other component of an intrusion protection system) can be more secure than other methods of communication. This may allow for intrusion protection data, messages, signals, commands, etc. to be sent between components more securely. As an additional example, communicated data may be transformed to a different format and/or protocol such that the communicated data is more secure. In certain embodiments, the communications between an application and another component may be according to an uncommon, secure, and/or proprietary protocol, further increasing data security and the authenticity of communications. For example, SSL (secure sockets layer) or tokenized communications may be used. Such communications also allow each component of the intrusion protection system to authenticate the incoming communication, which is critical in situations where intrusions may exist, and particularly if a compromising entity may have remote access to a remote device. In some embodiments, direct communication between the application and other components of an intrusion protection system may allow for communications, messages, commands, etc. to be sent to and/or from a remote device in the possession or control of a compromising entity without the compromising entity's knowledge and/or permission.

As yet another example advantage, certain embodiments of the present disclosure may also provide technical advantages to data networks by reducing the amount of network traffic and/or processing demands required to operate intrusion protection systems, and more particularly by reducing the amount of data sent by systems to remote devices. For instance, identifying individual communications with compromising entities and sending alerts or signals to block only those communications reduces network traffic compared to mass alerting all users, or even all users in a certain geographic area.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE EXAMPLE DRAWINGS

For a more complete understanding of the present disclosure and for further features and advantages thereof, reference is now made to the following description taken in conjunction with the accompanying example drawings, in which:

FIG. 2 illustrates a data table comprising example data regarding compromising entities and other information relevant to potential intrusion threats, which may be used, for example, in the system illustrated in FIG. 1 and/or the methods illustrated in FIGS. 3, 4, 5, and/or 6;

Figure 1:
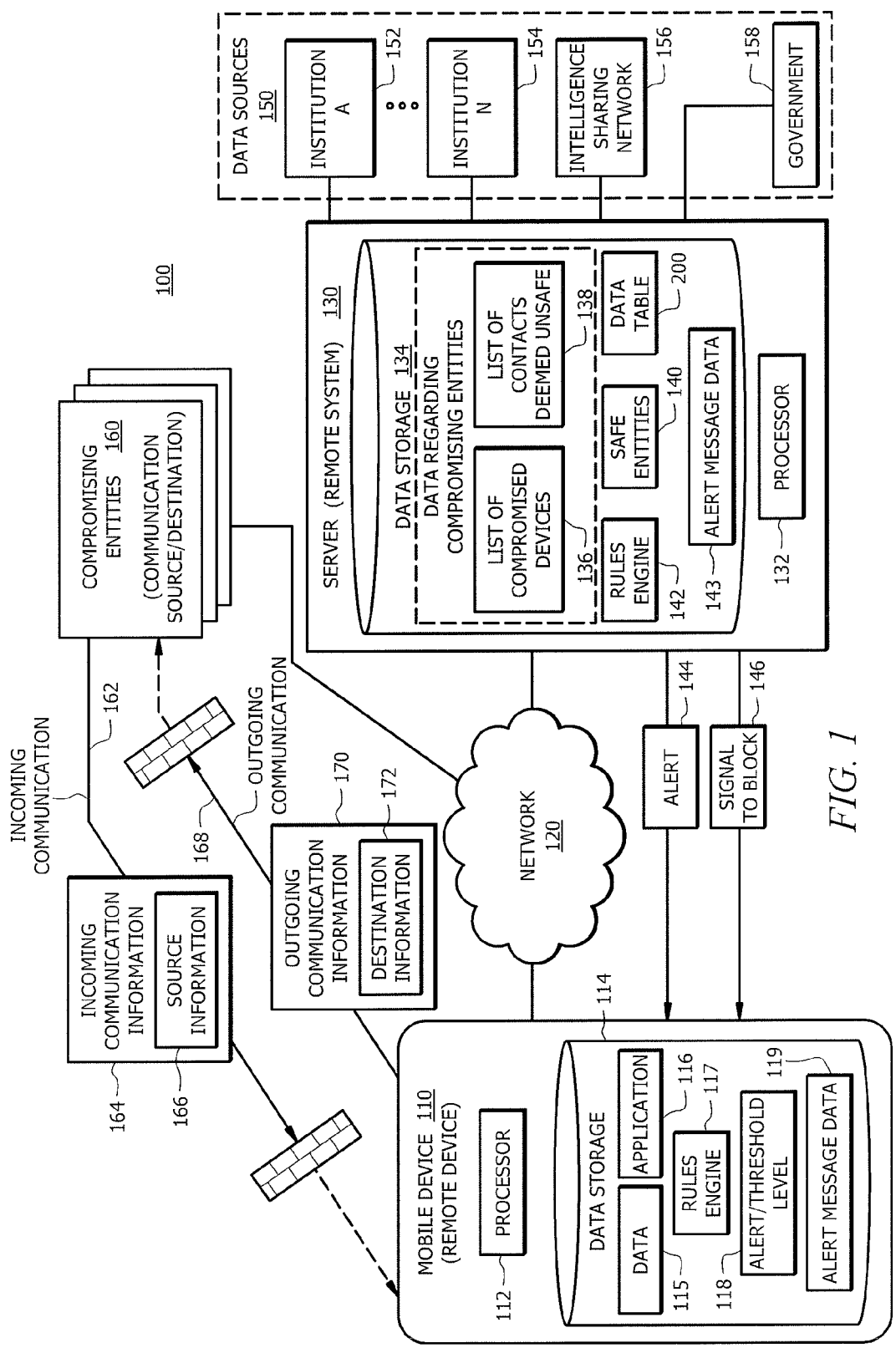
FIG. 1 illustrates a block diagram of an example proactive intrusion protection system, according to a particular embodiment.
Figure 5:
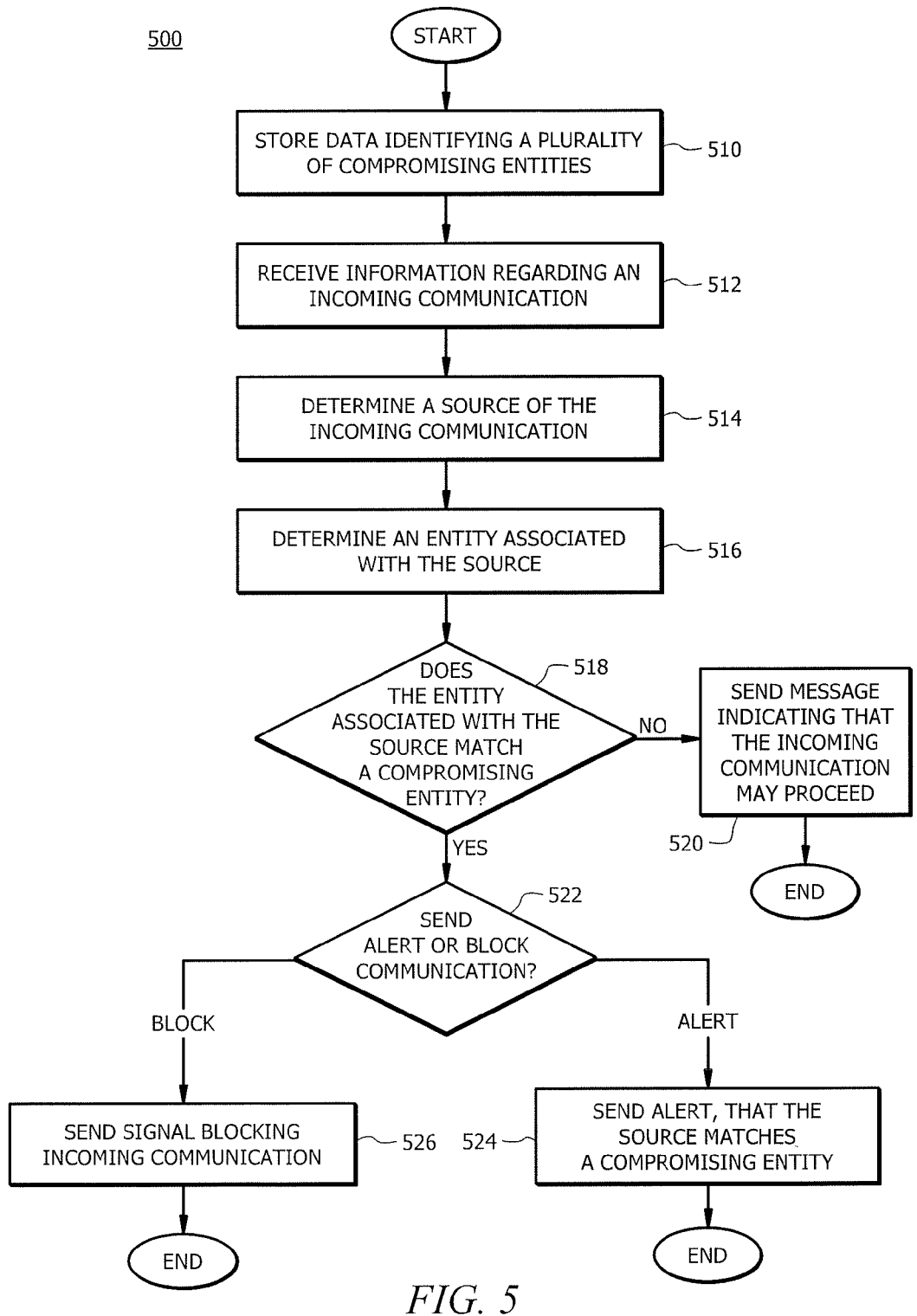
Figure 6:
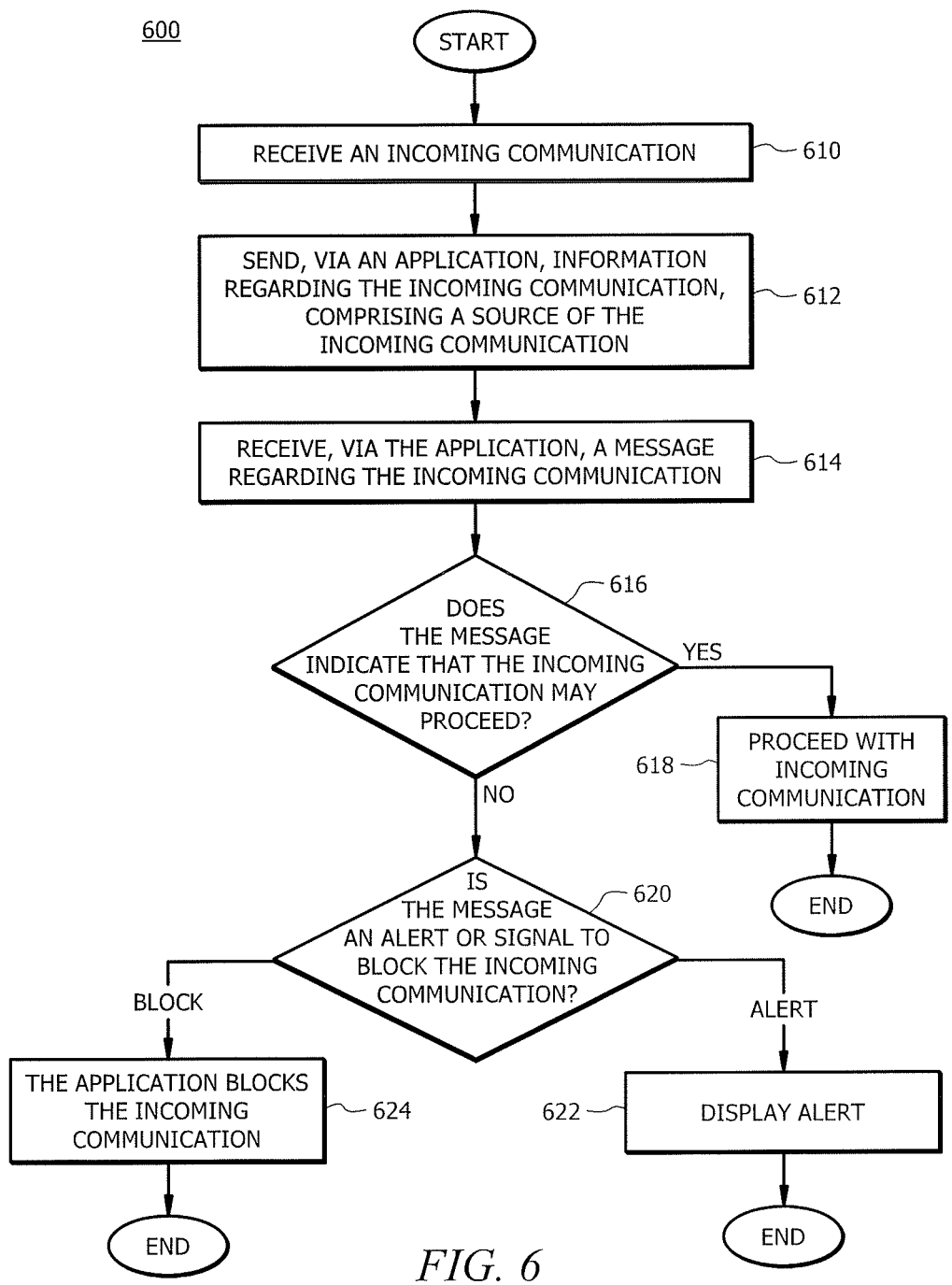

FIG. 5 illustrates a flowchart of an example method of proactive intrusion protection against incoming communications to a remote device, which may be used, for example, in the system illustrated in FIG. 1; and FIG. 6 illustrates a flowchart of another example method of proactive intrusion protection against incoming communications to a remote device, which may be used, for example, in the system illustrated in FIG. 1.

DETAILED DESCRIPTION

Embodiments of the present disclosure and its advantages are best understood by referring to FIGS. 1-6, like numerals being used for like and corresponding parts of the various drawings.

Digital telecommunication networks and other computer networks are confronted with numerous security vulnerabilities inherent to computer networks. Often, communication and other networks are untrusted and vulnerable to entities seeking information associated with network users. These security vulnerabilities are further exacerbated when the networks are also used to communicate sensitive information, such as information regarding users' accounts with various institutions. For example, cellular, Internet (e.g., via WiFi), and other communication networks serving remote devices (e.g., mobile devices) are untrusted and vulnerable and can be accessed and/or used directly or indirectly by entities seeking to collect and/or request a user's sensitive information. In addition, the types of communications used on such networks, such as SMS, email, Internet communications, and others, are also inherently vulnerable to entities seeking to access or request a user's sensitive information. Not only are the types of communications vulnerable, but also users are vulnerable to incoming and outgoing communications using these same types of communications (e.g., telephone calls, MMS, or SMS to or from an entity seeking to misappropriate the user's information), particularly because the entities communicating with the user may be anonymous (which may include, for example, using a fake, seemingly legitimate identity). Ultimately, these network and communication vulnerabilities put users, and, in some cases, institutions, at risk of account intrusion (e.g., misappropriation), identity theft, and other malicious use of users' sensitive information, which could also cause negative regulatory, compliance, or monetary consequences. This disclosure focuses on various ways of increasing network security and reducing the scope and magnitude of certain present vulnerabilities of various computer networks, particularly by implementing proactive intrusion protection systems.

Proactive intrusion protection systems operate to protect against intrusions in specific instances where the threat of intrusion is likely or even certain. Instead of reactively sending out a mass message to users' remote devices regardless of whether or not any given user has had any contact with a suspected threat, proactive intrusion protection instead monitors certain communications in order to identify a particular intrusion threat, and then acts to mitigate the intrusion threat. For example, if a user is accesses a remote device and receives a communication from (e.g., via SMS, MMS, telephone, Internet, email, etc.) or attempts to communicate with a compromising entity known or suspected to be an intrusion threat, the proactive intrusion protection system may identify the communication as an intrusion threat and, for example, alert the user or block the communication.

As is applicable, the term "intrusion" as used herein may describe actual intrusions, attempted intrusions, and/or communications that further an intrusion or intrusion attempt.

Example Proactive Intrusion Protection Systems

FIG. 1 illustrates a block diagram of an example proactive intrusion protection system 100, according to a particular embodiment. System 100 may include mobile device 110 (and more generally any remote device), server 130, data sources 150, compromising entities 160, and a network 120. Network 120 may communicatively couple remote devices such as mobile device 110, server 130, data sources 150, compromising entities 160, and/or any components contained within or controlled by such devices, servers, or data sources. In general, remote devices (such as mobile device 110) and remote systems (such as server 130), using data sources 150, may protect against, stop, or mitigate intrusions from compromising entities 160.

Example Proactive Intrusion Protection Systems—Networks

Proactive intrusion protection systems such as system 100 may comprise network 120. Network 120 represents any suitable network operable to facilitate communication between the components of system 100, such as mobile device 110, server 130, data sources 150, compromising entities 160, and/or any components contained within or controlled by such devices. In particular embodiments, network 120 may also connect the components of system 100 to any other component, system, or entity via, for example, the Internet. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Network 120 may comprise multiple networks connecting some or all of the components of system 100. For example one portion of network 120 may be a cellular telephone network connecting mobile device 110 and a compromising entity 160, while another portion of network 120 may be an Internet connection between mobile device 110 and server 130.

Example Proactive Intrusion Protection Systems—Remote Devices

Proactive intrusion protection systems such as system 100 may comprise remote devices. In general, remote devices such as mobile device 110 may assist in intrusion protection, such as in proactive intrusion protection systems. In particular embodiments, proactive intrusion protection may include preventing, stopping, and/or mitigating intrusions. This may include protecting against instances where a remote device 110 is accessed or contacted by a compromising entity 160, where the compromising entity 160 is a possible source of intrusion. For example, a compromising entity 160, such as a team of intruders, may contact mobile device 110 via SMS, telephone, or other means pretending to be a legitimate operation but secretly seeking information that can be used to access an account, such as a bank account, associated with a user of the mobile device. In certain instances, mobile device 110 (or a user thereof) may be the target of various intrusions, such as "phishing," "vishing," "pharming," "srnishing," similar threats via social media, and other ways of misappropriating information. In particular embodiments, compromising entities 160 and/or devices controlled by such compromising entities 160 may seek information to access personal information or accounts associated with a remote device such as mobile device 110 or a user of a remote device such as mobile device 110.

Mobile device 110 may also be remotely accessed by a compromising entity 160, or, in certain situations, a compromising entity 160 may take physical possession of mobile device 110. Once a compromising entity 160 has remote or physical access to a remote device such as mobile device 110, the compromising entity 160 may attempt to access personal information, accounts, or other property owner or associated with a user of the mobile device 110. Intrusion protection systems, particularly proactive intrusion protection systems, seek to prevent, stop, or mitigate these and other instances of intrusions. As a possible point of contact with compromising entities 160, remote devices such as mobile device 110 may represent both vulnerable points susceptible to intrusion, as well as points from which to collect information regarding intrusions and/or protect against intrusions. In certain embodiments, proactive intrusion protection systems may alert mobile device 110 of an incoming communication 162 from a source associated with a compromising entity 160. It other situations, proactive intrusion protection systems may alert mobile device 110 of an outgoing communication 168 from mobile device 110 to a destination associated with a compromising entity 160 before such outgoing communication 168 is sent.

In other instances, proactive intrusion protection systems may prevent remote devices, such as mobile devices 110, from communicating with compromising entities 160. Furthermore, in other instances, proactive intrusion protection systems may prevent remote devices, such as mobile devices 110, from communicating with some or all other devices in situations where the remote device itself has become compromised and is a potential source of intrusions. This may occur, for example, if a compromising entity 160 compromises the remote device, causing the remote device to, for example, send intrusion messages that may further additional intrusions to contacts stored on the remote device. In the illustrated embodiment, mobile device 110 comprises processor 112, data storage 114, data 115, application 116, rules engine 117, alert level (also described as threshold level) 118, and alert message data 119.

In particular embodiments, mobile device 110 may communicate with other components of system 100 via network 120. Mobile device 110 may include a personal computer, a workstation, a laptop, a wireless or cellular telephone, an electronic notebook, a personal digital assistant, a smartphone, a netbook, a tablet, a slate personal computer, or any other device (wireless, wireline, or otherwise) capable of receiving, processing, storing, and/or communicating information with other components of 100.

Mobile device 110 may include one or more processor 112. Processor 112 is generally operable to process and/or execute tasks associated with intrusion protection systems. For example, processor 112 may execute application 116. In particular embodiments, processor 112 may be communicatively coupled with data storage 114, application 116, and/or other components of system 100, such as server 130. In some embodiments, processor 112 may be operable to determine a destination of an outgoing communication 168 requested from mobile device 110 and/or whether the destination of the outgoing communication is associated with a compromising entity 160. In other embodiments, it may be operable to determine a source of an incoming communication 162 and/or whether the source is associated with a compromising entity 160. In particular embodiments, processor 112 may also determine an entity associated with the destination or source. For example, the processor may use public records or data sources 150 to determine an entity associated with the destination or source. Processor 112 may also execute application 116. Processor 112 may comprise any suitable combination of hardware and software to execute instructions and manipulate data to perform the described functions for mobile device 110 and/or system 100. In some embodiments, processor 112 may include, for example, one or more computers, one or more central processing units (CPUs), one or more microprocessors, one or more applications, and/or other logic.

Mobile device 110 may include one or more data storage 114. In general, data storage 114 stores data, including, for example, application 116, rules engine 117, alert level 118, and associated data 115, including data regarding contacts associated with mobile device 110, data regarding previous communications to and from mobile device 110, data regarding attempted and current communications to and from mobile device 110, data from data sources (e.g., server 130 and/or data sources 150), files, applications, and/or other data associated with mobile device 110.

Examples of data storage 114 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices or components that store one or more files, lists, tables, or other arrangements of information.

In particular embodiments, data storage 114 may store application 116 and associated data 115, rules engine 117, alert (threshold) level 118, and/or alert message data 119. In some embodiments, data storage 114 may store some or all of the data contained in data storage 134, including, for example, lists of compromised devices 136, lists of contacts deemed unsafe 138, and/or other data regarding compromising entities 160 compromising entities 160, as well as a list of trusted safe entities 140, rules engine 142, or data table 200. In certain embodiments, data storage 114 may store a rules engine 117 or other set of rules regarding when and how to (1) alert a user of intrusion risks and/or (2) block (or pause, quarantine, etc.) some or all communications to and/or from mobile device 110. As an example, the rules engine 117 may be used to dictate that an alert (e.g., alert 144) and/or signal to block (e.g., signal to block 146) will be sent (or displayed) in certain situations, such as when geographic conditions are met (e.g., the intrusions at issue are occurring in a particular geographic area), when the affected mobile device is of a particular type or upgrade version, at particular days and/or times, when the intrusion risk is applicable to commercial versus personal or individual users or devices, etc. In certain embodiments, data storage 114 may contain data comprising any data useful to support the function or operation of mobile device 110 and/or intrusion protection system 100. Such data may comprise any number of databases and/or data tables, such some or all of data table 200. Such data, as well as any other data associated with mobile device 110, including application 116, may be stored on any suitable device or component capable of storing and facilitating retrieval of such data, for example, data storage 114 and/or data storage 134.

Mobile device 110 may comprise alert message data 119. In general, alert message data 119 is used by components of system 100 to store and retrieve information regarding alert messages. In certain embodiments, data storage 114 may comprise alert message data 119, where alert message data 119 comprises alert message contents and associated data. For example, alert message data 119 may comprise scripts, alert message text, message identifiers, etc. in the form of a database, table, or other format. Alert message data 119 may, for instance, be used as a repository of pre-formed messages that a remote device can use to quickly generate a message in response to an incoming alert. In certain embodiments, alert message data 119 may comprise a database or table that associates alert message data with message identifiers (where the message identifiers may be smaller in size than the associated alert message data). Thus, for example, application 116 could receive an alert from server 130 comprising a message identifier and, by using alert message data 119, could locate the message associated with that message identifier and display it to a user. Alert message data 119 may be updated by one or more components of system 100. In addition, alert message data 119 may be hosted on any component of system 100 or other component connected to network 120.

Example Proactive Intrusion Protection Systems—Applications

Proactive intrusion protection systems such as system 100 may comprise applications. Remote devices such as mobile device 110 may include one or more application 116. Application 116 generally refers to logic, rules, algorithms, code, tables, and/or other suitable instructions for executing any suitable functions regarding the operation of intrusion protection system 100. Application 116 may also be an application associated with an institution, such as a banking institution, such that application 116 allows a user to access and/or control his account with the banking institution. In particular embodiments, application 116 may communicate with server 130 regarding communications requested by mobile device 110. Such communications may include telephone calls, text messages, emails, transactions (including transactions performed on application 116), and/or any other communications. Application 116 may monitor or otherwise have access to information regarding incoming communications 162 and outgoing communications 168 requested by a mobile device 110. In certain instances, application 116 may recognize that an outgoing communication 168 has been requested on mobile device 110 (or that mobile device 110 has received an incoming communication 162), at which point application 116 may collect and send information regarding the communication (including, for example, information regarding the source or destination of the incoming or outgoing communication) to components of system 100, such as server 130. In other embodiments, application 116 may collect and analyze information regarding the incoming or outgoing communication (including, for example, information regarding the source or destination of the incoming or outgoing communication).

In some embodiments, communications between application 116 and server 130 may use proprietary protocols, SSL (secure sockets layer) or tokenized communications, or any other means of increasing the security and authenticity of communications between application 116 and server 130, or any other component of system 100. Furthermore, in such embodiments, data comprising the communications between components (such as application 116 and server 130) may be transformed from an original form into a more secure form for transmission between components. Once received, the data may be transformed from the secure form back to the original form.

Additionally, in certain embodiments, application 116 may receive from server 130 (or other components of system 100) data regarding compromising entities 160 and/or intrusion threats, which application 116 may use to determine a source or destination of particular incoming (162) or outgoing (168) communications, determine an entity associated with the one or more sources or destinations, and/or determine whether the source or destination is associated with a compromising entity 160. In particular embodiments, application 116 may receive the data regarding compromising entities 160 and/or intrusion threats from components of system 100 in real time and/or in batches of information. Batches may be received as part of an update schedule that may be periodic or may be affected by the severity of intrusion threats existing at any particular time.

If application 116 determines that the source or destination of a particular incoming or outgoing communication is associated with a compromising entity 160, application 116 may generate an alert to the user and/or may block the particular incoming or outgoing communications to and/or from the mobile device (for example, the incoming communication 162 and/or outgoing communication 168).

In other embodiments, application 116 may receive from server 130 (or other components of system 100) messages and/or alerts 144 regarding potential intrusion threats. For example, application 116 may receive from server 130 an alert 144 regarding an incoming communication 162 or an outgoing communication 168 requested by mobile device 110. The alert 144 may be a pre-formed alert ready for display on mobile device 110 (or otherwise communicated to a user), or the alert 144 may be a communication instructing application 116 to generate and communicate an alert to a user and/or on mobile device 110. Application 116 may then display the alert to a user of mobile device 110. The alert (whether, e.g., generated by application 116 or sent as alert 144 from server 130) may describe the nature of an intrusion threat, a recommended course of action, a contact for questions (e.g., a telephone number), and/or some of all of the information comprising data table 200. Application 116 may also display, as part of the alert, an option to the user to continue with or to block the incoming or outgoing communication. Before and while a user selects an option, application 116 may quarantine or pause the incoming communication 162 or outgoing communication 168.

Furthermore, in certain embodiments, the alert message (e.g., alert 144) may be customized per the specific threat (e.g., as indicated by a specific event ID) or be generic to the type of incoming or outgoing communication (e.g., phone, email, SMS, and/or MMS). The alert may be sent as a notification to mobile device 110 even if the user is using a different application than application 116, or the alert may be sent only when the mobile device is running (or the user is accessing) application 116. The alert may also, in particular embodiments, add contact information associated with the compromising entity 160 (e.g., phone number, email address, screen name, etc.) and/or a source or destination of an incoming or outgoing communication to a "deny" or "blocked contacts" list on the mobile device and/or on application 116.

In certain situations, components of system 100 may send alert messages (e.g., alert 144) updating "deny" and "blocked contacts" lists before mobile device 110 has any actual incoming or outgoing communications from or to a particular compromising entity 160. In some embodiments, the alert may instruct the user of the general risk and/or may provide the user with an intrusion or fraud servicing phone number (or other contact information) of one or more institutions relevant to the intrusion (e.g., a phone number or email address of the fraud department of the bank associated with the user's account that was the subject of the attempted intrusion). The user may then contact the institution to mitigate his risk, which may include opening an event ticket tied to the intrusion. By contacting the institution to report the activity, the user may improve the system's (or institution A-N's 152-154) intrusion risk information, analysis, and mitigation potential. In certain embodiments, the user may contact the institution via application 116, or application 116 may automatically send relevant information to the institution (e.g., to server 130).

In some embodiments, the components of system 100 may send and/or receive alert messages (e.g. an alert 144 or other transmissions) comprising a message identifier (or other instructions) that identify a particular alert message stored in alert message data 119 and/or alert message data 143. The message identifier may cause the particular alert message to be displayed on components of system 100. For example, upon receipt of a message identifier corresponding to a particular alert message stored in alert message data 119, application 116 and/or mobile device 110 may display on application 116 and/or mobile device 110 the particular alert message stored in alert message data 119.

In other situations, the components of system 100 may send and/or receive alert messages (e.g. an alert 144 or other transmission) comprising an update to certain alert message data (e.g., alert message data 119 and/or alert message data 143). The update may comprise information associated with alert message data, such as scripts, alert message text, message identifier information, etc. For example, server 130 may send to application 116 and/or mobile device 110 an alert 144 comprising an update to alert message data 119 (the alert 144 may or may not comprise other data), where the update comprises alert scripts stored in alert message data 143. Upon receiving the update, application 116 and/or mobile device 110 may update alert message data 119 with the updated scripts, which may be used in current or future alerts displayed by application 116 and/or mobile device 110.

In still other embodiments, server 130 (or other components of system 100) may send application 116 messages and/or signals to block 146 certain incoming (162) and/or outgoing (168) communications to and/or from mobile device 110. For example, such messages and/or signals 146 may block certain incoming or outgoing communications automatically, or such messages and/or signals 146 may instruct application 116 to block such communications. In other embodiments, application 116 may generate alerts and/or signals to block incoming or outgoing communications on its own based on data accessible to application 116, such as data regarding compromising entities 160 that may be stored on data storage 114 or 134. Upon generating or receiving an alert (e.g., alert 144) and/or a signal to block (e.g., 146) incoming or outgoing communications, application 116 may temporarily pause, suspend, quarantine, or block certain communications until further instructions are received from a user, server 130, a relevant institution, and/or any other component of system 100.

Furthermore, in certain embodiments the incoming communication 162 or outgoing communication 168 may be a transaction or transaction request, where the transaction requested is associated with an account associated with application 116 and/or the user of mobile device 110. For example, a transaction request for a balance transfer into or out of a bank account or to make a purchase may occur. The transaction request may be made via application 116 in certain embodiments. Application 116 may send information to server 130 or other components of system 100 to determine if the transaction is associated with and/or initiated by a compromising entity 160. For example, the payee of a transaction, the recipient of a transaction, the number and/or amount of one or more transactions, transaction patterns, the source of recent incoming communications 162 to the remote device, the destination of recent outgoing communication 168 from the remote device, and various other information regarding the transaction may be used to determine that the transaction involves a compromising entity 160. Such information may be compared to data stored in data storage 114 or 134, for example data regarding compromising entities 160. In certain embodiments, server 130 may send to application 116 an alert 144 or signal to block 146 the transaction. In other embodiments, application 116 may make such determinations itself using data located on data storage 114, 134, or any other component of system 100. If the transaction is associated with, directed to, or initiated by a compromising entity 160, application 116 may generate an alert and/or signal to block the requested transaction.

In addition, in particular embodiments, application 116 may allow a user of a remote device such as mobile device 110 to set different alert levels 118, which may also be described as threshold levels in certain embodiments. The alert levels 118 may indicate the sensitivity the user wishes application 116 to have when alerting the user. For example, the user could indicate preferred alert levels 118 on a scale of severity ranging from, for example, levels 1 through 5, where level 1 indicates that only very serious alerts (e.g., where the potential damage is great and/or where greater than 80 percent of the relevant population may be affected) are shown to the user and where level 5 indicates that all or nearly all alerts are shown to the user, regardless of severity (e.g., the potential damage and/or the percentage of the relevant population affected). The preferred alert level may be stored or sent to any component of system 100. Application 116 may determine the applicable alert level 118 of any given alert, or it may receive the alert level 118 of any given alert (e.g., alert 144) from server 130 or any other component of system 100. In other embodiments, if only a certain geographic area is affected, application 116 may only generate or display an alert if it determines that the user (or the user's account) is in the affected geographic area. Application 116 may base its determination on data from server 130 or other components of system 100, on data stored in data storage 114, and/or on other components of remote device 110 that can obtain the physical location of the user (e.g., GPS, WiFi, IP address, social media, etc.).

Example Proactive Intrusion Protection
Systems—Remote Systems

Proactive intrusion protection systems such as system 100 may comprise remote systems. In general, remote systems such as server 130 may assist in intrusion protection, such as in proactive intrusion protection systems. Server 130 may comprise hardware and/or software, as well as logic, rules, algorithms, code, tables, and/or other suitable instructions for executing any suitable functions regarding the operation of intrusion protection system 100. Server 130 may be associated with an institution, such as a banking institution, and/or with application 116. In particular embodiments, server 130 may communicate with application 116 regarding incoming communications 162 to mobile device 110 and/or outgoing communications 168 initiated by mobile device 110. Such communications may include telephone calls, text messages, emails, transactions (including transactions performed on application 116), and/or any other communications. In certain instances, server 130 may receive from application 116 information regarding the incoming or outgoing communication (including, for example, information regarding the source or destination of the incoming or outgoing communication). In other embodiments, server 130 may collect (e.g., from mobile device 110, application 116, and/or data sources 150) and analyze information regarding the incoming or outgoing communication (including, for example, information regarding the source or destination of the incoming communication 162 or outgoing communication 168).

In some embodiments, communications between application 116 and server 130 may use proprietary protocols, SSL (secure sockets layer) or tokenized communications, or any other means of increasing the security and authenticity of communications between application 116, or any other component of system 100, and server 130. Furthermore, in such embodiments, data comprising the communications between components (such as application 116 and server 130) may be transformed from an original form into a more secure form for transmission between components. Once received, the data may be transformed from the secure form back to the original form.

Additionally, in certain embodiments, server 130 may receive from application 116 (or other components of system 100, such as data sources 150) data regarding compromising entities 160 and/or intrusion threats, which server 130 may use to determine one or more sources or destinations of particular incoming (162) or outgoing (168) communications, determine an entity associated with the one or more sources or destinations, and/or determine whether the source or destination is associated with a compromising entity 160.

If server 130 determines that the source or destination of a particular incoming or outgoing communication is associated with a compromising entity 160, server 130 may (1) generate an alert 144 and send the alert 144 to application 116 and/or a remote device such as mobile device 110 and/or (2) generate a signal to block 146 the particular incoming or outgoing communications to and/or from the mobile device (for example, incoming communication 162 and/or outgoing communication 168) and send the signal 146 to application 116 and/or a remote device such as mobile device 110.

In other embodiments, server 130 may send to application 116 (or other components of system 100) messages and/or alerts 144 regarding potential intrusion threats. For example, server 130 may send to application 116 an alert 144 regarding an incoming communication 162 or an outgoing communication 168 requested by mobile device 110. The alert 144 may be a pre-formed alert ready for display on mobile device 110 (or otherwise communicated to a user), or the alert 144 may be a communication instructing application 116 to generate and communicate an alert to a user and/or on mobile device 110. In certain embodiments, the alert (whether, e.g., generated by application 116 or sent as alert 144 from server 130) may describe the nature of an intrusion threat, a recommended course of action, a contact for questions (e.g., a telephone number), and/or some or all of the information comprising data table 200. Server 130 may also instruct application 116 to display an alert and/or display an option to the user to continue with or to block the incoming or outgoing communication. Before and while a user selects an option, alert 144 may cause application 116 to quarantine or pause the incoming communication 162 or outgoing communication 168.

Furthermore, in certain embodiments, the alert message (e.g., alert 144) may be customized per the specific threat (e.g., as indicated by a specific event ID) or be generic to the type of incoming or outgoing communication (e.g., phone, email, SMS, and/or MMS). The alert may be sent as a notification to mobile device 110 even if the user is using a different application than application 116, or the alert may be sent only when the mobile device is running (or the user is accessing) application 116. The alert may also, in particular embodiments, add contact information associated with the compromising entity 160 (e.g., phone number, email address, screen name, etc.) and/or a source or destination of an incoming or outgoing communication to a "deny" or "blocked contacts" list on the mobile device and/or on application 116.

In certain situations, components of system 100 may send alert messages (e.g., alert 144) updating "deny" and "blocked contacts" lists before mobile device 110 has any actual incoming or outgoing communications from or to a particular compromising entity 160. In some embodiments, the alert may instruct the user of the general risk and/or may provide the user with an intrusion or fraud servicing phone number (or other contact information) of one or more institutions relevant to the intrusion (e.g., a phone number of the fraud department of the bank associated with the user's account that was the subject of the attempted intrusion). The user may then contact the institution to mitigate his risk, which may include opening an event ticket tied to the intrusion. By contacting the institution to report the activity, the user may improve the system's intrusion risk information, analysis, and mitigation potential. In certain embodiments, the user may contact the institution via application 116, or application 116 may automatically send relevant information to the institution (e.g., to server 130).

In some embodiments, the components of system 100 may send and/or receive alert messages (e.g. an alert 144 or other transmissions) comprising a message identifier (or other instructions) and/or an update to alert message data (e.g., alert message data 119 and/or alert message data 143), as previously described.

In still other embodiments, server 130 (or other components of system 100) may send application 116 messages and/or signals to block 146 certain incoming (162) and/or outgoing (168) communications to and/or from mobile device 110. For example, such messages and/or signals 146 may block certain incoming or outgoing communications automatically, or such messages and/or signals 146 may instruct application 116 to block such communications. In other embodiments, server 130 may instruct application 116 to temporarily pause, suspend, quarantine, or block incoming or outgoing communications until further instructions are received from a user, server 130, a relevant institution, and/or any other component of system 100. In particular embodiments, server 130 may send or receive an authentication message to or from application 116 that may confirm that the alert 144 and/or signal to block 146 was received by a legitimate application, device, or entity.

Furthermore, in certain embodiments the incoming communication 162 or outgoing communication 168 may be a transaction or transaction request, where the transaction requested is associated with an account associated with application 116 and/or the user of mobile device 110. For example, a transaction request for a balance transfer into or out of a bank account or to make a purchase may occur. The transaction request may be made via application 116 in certain embodiments. Server 130 may receive information regarding the requested transaction from mobile device 110, application 116, or any other component of system 100. Server 130 may also determine if the transaction is associated with and/or initiated by a compromising entity 160. For example, the payee of a transaction, the recipient of a transaction, the number and amount of one or more transactions, transaction patterns, the source of recent communications to the remote device, and various other information regarding the transaction may be used to determine that the transaction involves a compromising entity 160. Such information may be compared to data stored in data storage 134, for example data regarding compromising entities 160. If the transaction is associated with, directed to, or initiated by a compromising entity 160, server 130 may send an alert 144 and/or signal to block 146 the requested transaction to other components of system 100. In certain embodiments, server 130 may block the requested transaction itself.

In particular embodiments, server 130 and/or any components thereof may include a network server, any suitable remote server, a mainframe, a host computer, a workstation, a web server, a personal computer, a file server, or any other suitable device operable to communicate with other components in system 100 and assist with the function of server 130, such as intrusion protection. In particular embodiments, the functions of server 130 may be performed by any suitable combination of one or more servers or other components at one or more locations. In addition, the server may be a private server, and the server may be a virtual or physical server. In the illustrated embodiment, server 130 comprises processor 132, data storage 134, list of compromised devices 136, list of contacts deemed unsafe 138, safe entities 140, rules engine 142, and data table 200.

Server 130 may include one or more processors 132. Processor 132 is generally operable to process and/or execute tasks associated with intrusion protection systems. In particular embodiments, processor 132 may be communicatively coupled with data storage 134, including list of compromised devices 136 and list of contacts deemed unsafe 138, rules engine 142, safe entities 140, data table 200, data sources 150, and/or other components of system 100, such as mobile device 110 and/or application 116. In some embodiments, processor 132 may be operable to determine a destination of an outgoing communication 168 from mobile device 110 and/or whether the destination of the outgoing communication is associated with a compromising entity 160. In other embodiments, it may be operable to determine a source of an incoming communication 162 and/or whether the source is associated with a compromising entity 160. In particular embodiments, processor 132 may also determine an entity associated with the destination. For example, the processor may use public records or data sources 150 to determine an entity associated with the destination or source. Processor 132 may execute application 116 and/or send or receive messages or other data from application 116. Processor 132 may comprise any suitable combination of hardware and software to execute instructions and manipulate data to perform the described functions for server 130 and/or system 100. In some embodiments, processor 132 may include, for example, one or more computers, one or more central processing units (CPUs), one or more microprocessors, one or more applications, and/or other logic.

Server 130 may include one or more data storage 134. In general, data storage 134 stores data, including, for example, data regarding compromising entities 160 such as lists of compromised devices 136, lists of contacts deemed unsafe 138, data regarding "safe" or "trusted" entities 140, rules engine 142, alert message data 143, data table 200, data regarding previous communications to and from server 130 and/or remote devices, data regarding attempted and current communications to and from server 130 and/or remote devices, data from data sources (e.g., mobile device 110 and/or data sources 150), files, applications, and/or other data associated with server 130.

Examples of data storage 134 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices or components that store one or more files, lists, tables, or other arrangements of information.

In particular embodiments, data storage 134 may store a list of compromised devices 136 and/or a list of contacts deemed unsafe 138 and other data associated with the functions of a remote system such as server 130 (e.g, data regarding safe entities 140, rules engine 142, alert message data 143, data table 200, etc.). In some embodiments, data storage 134 may store some or all of the data contained in data storage 114, including, for example, application 116, data 115, rules engine 117, alert (threshold) level 118, and/or other data regarding remote devices such as mobile device 110. In certain embodiments, data storage 134 may store a rules engine 142 or other set of rules regarding when and how to (1) alert a user and/or mobile device of intrusion risks and/or (2) block (or pause, quarantine, etc.) some or all communications to and/or from mobile device 110. As an example, the rules engine 142 may be used to dictate that an alert (e.g., alert 144) and/or signal to block (e.g., signal to block 146) will be sent (or displayed) in certain situations, such as when geographic conditions are met (e.g., the intrusions at issue are occurring in a particular geographic area), when the affected mobile device is of a particular type or upgrade version, at particular days and/or times, when the intrusion risk is applicable to commercial versus personal or individual users or devices, etc. In certain embodiments, such data comprises safe entities 140, which comprises information regarding entities and/or devices that are known to be safe (e.g., are "trusted") and are unlikely to pose an intrusion threat. In other embodiments, data storage 134 may contain data comprising any data useful to support the function or operation of server 130 and/or intrusion protection system 100. Such data may comprise any number of databases and/or data tables, such some or all of data table 200. Such data, as well as any other data associated with server 130, including any list of compromised devices 136 and/or list of contacts deemed unsafe 138, may be stored on any suitable device or component capable of storing and facilitating retrieval of such data, for example, data storage 134 and/or data storage 114.

Server 130 may include one or more list of compromised devices 136. In general, list of compromised devices 136 comprises data associated with devices that are known and/or suspected to be associated with compromising entities 160 or represent actual or potential sources of intrusion. For example, list of compromised devices 136 may include mobile devices such as phones, tablets, smartwatches, as well as servers, computers, or any other physical or virtual device that may represent a threat of intrusion. In certain embodiments, list of compromised devices 136 may include physical and/or virtual destinations, particular physical or virtual machines or devices, particular MAC addresses, international mobile station equipment identities (IMEI), or IP addresses, and/or any other additional information or relevant identifiers or data related to compromised devices. In particular embodiments, list of compromised devices 136 may comprise some or all of the data in data table 200. The data comprising any list of compromised devices 136 may be in any format useful to the function of server 130 and/or components of system 100. List of compromised devices 136 may be stored on data storage 134, data storage 114, or any other location useful to the function of server 130 and/or components of system 100. In particular embodiments, individual devices included in the list of compromised devices 136 may be associated with one or more compromising entities 160. Conversely, multiple individual devices included in the list of compromised devices may be associated with a single compromising entity 160.

Server 130 may include one or more list of contacts deemed unsafe 138. In general, list of contacts deemed unsafe 138 comprises data associated with contacts, such as any entity, that are known and/or suspected to be associated with compromising entities 160 or represent actual or potential sources of intrusion. For example, list of contacts deemed unsafe 138 may include an identifier of a contact comprising or associated with a compromising entity 160, for instance a name, screen name, address, organization name, zip code, phone number, email address, voice biometrics, geographic source or destination (e.g. a country, city, or other geographical area), and/or any other relevant identifier associated with a contact that may represent a threat of intrusion. In particular embodiments, list of contacts deemed unsafe 138 may comprise some or all of the data in data table 200. The data comprising any list of contacts deemed unsafe 138 may be in any format useful to the function of server 130 and/or components of system 100. List of contacts deemed unsafe 138 may be stored on data storage 134, data storage 114, or any other location useful to the function of server 130 and/or components of system 100. In particular embodiments, individual contacts included in the list of contacts deemed unsafe 138 may be associated with one or more compromising entities 160. Conversely, multiple individual contacts included in the list of contacts deemed unsafe 138 may be associated with a single compromising entity 160.

Server 130 may comprise alert message data 143. In general, alert message data 143 is used by components of system 100 to store and retrieve information regarding alert messages. Alert message data 143 is similar to alert message data 119 and may exist and operate in the same ways previously described regarding alert message data 119. In certain embodiments, alert message data 143 may be used by components of system 100 to update alert message data 119, or vice versa. In other embodiments, server 130 and/or data sources 150 may update alert message data 143. In addition, alert message data 119 may be hosted on any component of system 100 or other component connected to network 120.

Example Proactive Intrusion Protection Systems—Data Sources

Proactive intrusion protection systems such as system 100 may comprise data sources. In general, data sources 150 may assist in in intrusion protection, such as in proactive intrusion protection systems. This may include, for example, providing information to intrusion protection systems, such as components of system 100, to assist in proactive intrusion protection. For example, data sources 150 may send data to be included in a list of compromised devices 136 or a list of contacts deemed unsafe 138. Data sources 150 may provide any information helpful to the function of server 130 or intrusion protection systems such as system 100. In particular embodiments, data sources 150 may provide some or all of the data comprising data table 200. In some embodiments, the individual data sources comprising data sources 150 may be independent of one another or part of a network of sources pooling information to combat intrusions. In certain instances, some or all of data sources 150 may update certain components of system 100 in real time and/or in batches of information. In other embodiments, data sources 150 may comprise remote devices, such as mobile device 110 running applications such as application 116, where the remote device and/or application reports data regarding intrusions. In the illustrated embodiment, data sources 150 comprises institutions A-N 152-154, intelligence-sharing network 156, and government source 158.

Data sources 150 may include one or more institutions A-N 152-154. In general, institutions A-N 152-154 represent any institution where users maintain accounts that are potential targets of intrusion. Institutions A-N 152-154 represent any number "N" of institutions. In particular embodiments, some or all of institutions A-N are banking institutions. In particular embodiments, institutions A-N 152-154 may monitor intrusions, users, and/or compromising entities 160. In some embodiments, institutions A-N 152-154 may analyze intrusion risks and data for certain accounts, users, geographies, etc. Institutions A-N 152-154 may communicate data related to their monitoring and analysis of intrusions to intrusion protection systems such as components of system 100 (e.g., server 130). For example, institutions A-N may provide some or all of the data comprising data table 200. In certain embodiments, some or all of the institutions comprising institutions A-N 152-154 may be individual branches of a single common institution, such as a bank, or they may be independent institutions. In some embodiments, institutions may be associated with applications installed on remote devices, such as application 116. For example, institution A 142 may issue application 116, which a user of mobile device 110, who has an account with institution A 142, may install on mobile device 110.

Data sources 150 may include one or more intelligence-sharing network 156. In general, intelligence-sharing network 156 seeks to prevent, stop, and/or mitigate intrusions by collecting and distributing data regarding intrusions as quickly as possible. In particular embodiments, intelligence-sharing network 156 may be comprised of various members or sources that contribute information to intelligence-sharing network 156. In some embodiments, some of all of institutions A-N may contribute to or maintain intelligence-sharing network 156. In particular embodiments, intelligence-sharing network 156 may monitor intrusions, users, and/or compromising entities 160. In some embodiments, intelligence-sharing network 156 may analyze intrusion risks and data for certain accounts, users, geographies, etc. Intelligence-sharing network 156 may communicate data related to its monitoring and analysis of intrusions to intrusion protection systems such as components of system 100 (e.g., server 130). For example, intelligence-sharing network 156 may provide some or all of the data comprising data table 200.

Data sources 150 may include one or more government source 158. In general, government source 146 is a government-controlled source that contains information helpful to preventing, stopping, and/or mitigating intrusions by collecting and distributing data regarding intrusions. In particular embodiments, government source 158 may be comprised of various government programs, agencies, departments, etc. In some embodiments, government source 158 may monitor intrusions and/or compromising entities 160. In other embodiments, government source 158 may analyze intrusion risks and data for certain accounts, industries, geographies, etc. Government source 158 may communicate data related to its monitoring and analysis of intrusions to intrusion protection systems such as components of system 100 (e.g., server 130). For example, government source 158 may provide some or all of the data comprising data table 200.

Example Proactive Intrusion Protection Systems—Compromising Entities and Associated Communications Proactive intrusion protection systems such as system 100 may protect against various compromising entities. In general compromising entities 160 represent any number of entities that pose an actual or potential intrusion threat, such as persons, organizations, countries, governments, computer viruses, programs, etc. In certain embodiments, compromising entities 160 may be devices associated with one or more compromising entities, for example, a personal computer, a workstation, a laptop, a wireless or cellular telephone, an electronic notebook, a personal digital assistant, a smartphone, a netbook, a tablet, a slate personal computer, a server, a network or any other device (wireless, wireline, or otherwise) capable of receiving, processing, storing, and/or communicating information with other components of 100. In particular embodiments, a compromising entity 160 may represent a source of an incoming communication 162 to a remote device, e.g., mobile device 110. In other embodiments, a compromising entity 160 may represent a destination of an outgoing communication 168 from a remote device, e.g., mobile device 110. In the illustrated example embodiment of system 100, compromising entities may initiate (be the source of) an incoming communication 162 to mobile device 110 and/or receive (be the destination of) an outgoing communication 168.

In general, incoming communication 162 is any type of communication, including communications originating from a compromising entity 160, that is directed toward a remote device (e.g., mobile device 110). In certain embodiments, incoming communication 162 may be a telephone call, SMS, MMS, email, Internet server request or response, transaction, transaction request, electronic data packets, or any other type of communication. In particular embodiments, incoming communication 162 represents an intrusion threat and/or furthers an actual or attempted intrusion associated with a compromising entity 160. In the illustrated embodiment, incoming communication 162 comprises incoming communication information 164 and source information 166.

In general, incoming communication information 164 comprises information related to incoming communication 162. In particular embodiments, incoming communication information 164 may comprise information regarding the type of communication, the network being used, the time the communication was initiated and/or arrived, the status of the communication, the technical specifications of the communication, metadata, and/or any other information related to incoming communication 162. In some embodiments, incoming communication information 164 may comprise source information 166.

In general, source information 166 comprises information about the source of incoming communication 162. In particular embodiments, source information 166 may comprise information regarding a compromising entity 160, where the compromising entity 160 represents the source of incoming communication 162. In some embodiments, source information 166 may comprise the name, IP address, address, telephone number, port number, geographic location, or any other information regarding the source of incoming communication 162 (e.g., a compromising entity 160). Source information 166 may also comprise, or be contained within, metadata such as header information in data packets that comprise incoming communication 162. Such header information may be extracted, analyzed, transformed, or otherwise used by components of system 100, such as mobile device 110 (including application 116) and server 130, to determine the source of an incoming communication 162. In particular embodiments, components of system 100, such as mobile device 110 and/or system 130 may use source information 166 to determine if the entity that originated incoming communication 162 is associated with a compromising entity 160.

In general, outgoing communication 168 is any type of communication, including communications originating from a remote device (e.g., mobile device 110) that is directed toward a compromising entity. In certain embodiments, outgoing communication 168 may be a telephone call, SMS, MMS, email, Internet server request or response, transaction, transaction request, electronic data packets, or any other type of communication. In particular embodiments, outgoing communication 168 represents an intrusion threat and/or furthers an actual or attempted intrusion associated with a compromising entity 160. In the illustrated embodiment, outgoing communication 168 comprises outgoing communication information 170 and destination information 172.

In general, outgoing communication information 170 comprises information related to outgoing communication 168. In particular embodiments, outgoing communication information 170 may comprise information regarding the type of communication, the network being used, the time the communication was initiated and/or arrived, the status of the communication, the technical specifications of the communication, metadata, and/or any other information related to outgoing communication 168. In some embodiments, outgoing communication information 170 may comprise destination information 172.

In general, destination information 172 comprises information about the destination of outgoing communication 168. In particular embodiments, destination information 172 may comprise information regarding a compromising entity 160, where the compromising entity 160 represents the destination of outgoing communication 168. In some embodiments, destination information 172 may comprise the name, IP address, address, telephone number, port number, geographic location, or any other information regarding the destination of outgoing communication 168 (e.g., a compromising entity 160). Destination information 172 may also comprise, or be contained within, metadata such as header information in data packets that comprise outgoing communication 170. Such header information may be used by components of system 100, such as mobile device 110 (including application 116) and server 130, to determine the destination of an outgoing communication 168. In particular embodiments, components of system 100, such as mobile device 110 and/or system 130 may use destination information 172 to determine if the entity that originated outgoing communication 168 is associated with a compromising entity 160.

A component of system 100 may include one or more of an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the disclosure. For example, system 100 may include any number remote devices (such as mobile devices 110), networks 120, server 130, data sources 150, and/or compromising entities 160. Particular components may be integrated or separated. Although components of system 100 are illustrated as separate components in FIG. 1, in some embodiments, components of system 100 may share one or more components or be further separated. In particular embodiments, components of system 100 may be implemented on virtual machines. Moreover, the operations may be performed by more, fewer, or other components and in different configurations. Additionally, any operations performed by system 100, such as determinations of whether the source or destination of an incoming or outgoing communication is associated with a compromising entity 160, may be performed using any suitable logic comprising software, hardware, and/or other logic. As used in this document, "each" refers to each member of a set or each member of a subset of a set.

Example Data Table Used by Proactive Intrusion Protection Systems

FIG. 2 illustrates a data table 200 comprising example data regarding compromising entities 160 and other information relevant to potential intrusion threats, according to a particular embodiment. In certain embodiments, some or all of data table 200, or some of all of the data contained therein, may be used by proactive intrusion protection systems, such as by components of system 100 of FIG. 1 and/or in steps of methods 300, 400, 500, and/or 600 illustrated in FIGS. 3-6.

In general, data table 200 may assist in performing proactive intrusion protection and may be used in intrusion protection systems. In certain embodiments, data table 200 (or any data therein) may be used to identify compromising entities (such as compromising entities 160) or other sources of intrusions. In other embodiments, data table 200 (or any data therein) may be used to confirm that a particular source or destination of an incoming communication 162 or outgoing communication 168 is or is not a compromising entity 160 or device operated or controlled by a compromising entity 160. In some example embodiments, data table 200 (or any data therein) may be used by server 130 to determine whether the source or destination of an incoming communication or an outgoing communication requested by mobile device 110 is associated with a compromising entity 160. In other embodiments, data table 200 (or any data therein) may be used by application 116 to determine whether the source or destination of an incoming or outgoing communication to or from mobile device 110 is associated with a compromising entity 160. In some embodiments, data table 200 and/or a subset of the data contained therein may be communicated directly or indirectly between an application associated with a remote device (e.g., application 116 on mobile device 110) and a component associated with an intrusion protection system, such as server 130. Certain data comprising data table 200 may also be communicated between data sources 150, server 130, mobile device 110, and/or application 116.

In particular embodiments, data table 200 may comprise data columns or rows such as date 210, event ID 212, entity identifier 214, location 216, and/or additional information 220. Such data rows and columns may comprise data associated with the name of the row or column. For example, the date 210 column may comprise dates that certain intrusions occurred or were reported or logged. Furthermore, the event ID 212 column may comprise an identifier (e.g. a number, symbol, or any other identifier) of various intrusion events and/or compromising entities. The entity identifier 214 column may comprise identifying information associated with compromising entities 160 or devices, such as phone numbers, names, email addresses, addresses, zip code, domain names, aliases, voice biometrics, international mobile station equipment identities (IMEI), IP addresses, etc. As another example, the location 216 column may comprise locations associated with certain intrusions, compromising entities 160, actual or potential intrusion victims, and/or the geographic area that may be affected by, or at risk of, certain intrusions. Location 216 column may contain any geographic location or area anywhere in the world. The additional information 220 column may compromise any additional information useful to an intrusion protection system. For example, the additional information 220 column may comprise a description of certain intrusions, including potential threats, and/or a description of the compromising entity 160. In certain embodiments, the additional information 220 column may comprise tactics used or reportedly used by compromising entities 160 and/or devices, the status of any response, the nature of any response, and/or any recommendations to users, devices, or organizations regarding combating a compromising entities 160 and/or intrusions.

The columns shown in data table 200 are exemplary and not exhaustive. In some embodiments, data table 200 may comprise data such as dates, event IDs or names, entity identifiers, physical and/or virtual destinations, particular physical or virtual machines or devices, particular MAC addresses, international mobile station equipment identities (IMEI), or IP addresses, and/or any other additional information or relevant identifiers or data. In example embodiments, the data displayed in data table 200 may comprise an identifier of an entity associated with a source or destination of an incoming or outgoing communication and/or a compromising entity 160, for instance a name, screen name, address, organization name, zip code, phone number, voice biometrics, geographic source or destination (e.g., a country, city, or other geographical area), and/or any other relevant identifier. Any such data and information may be contained in appropriate columns or rows, or in any other format useful to an intrusion protection system. Additionally, one of skill in the art will recognize that the inclusion of other data and information is possible without departing from the scope of the present disclosure.

Example Proactive Intrusion Protection Methods

Figure 3:
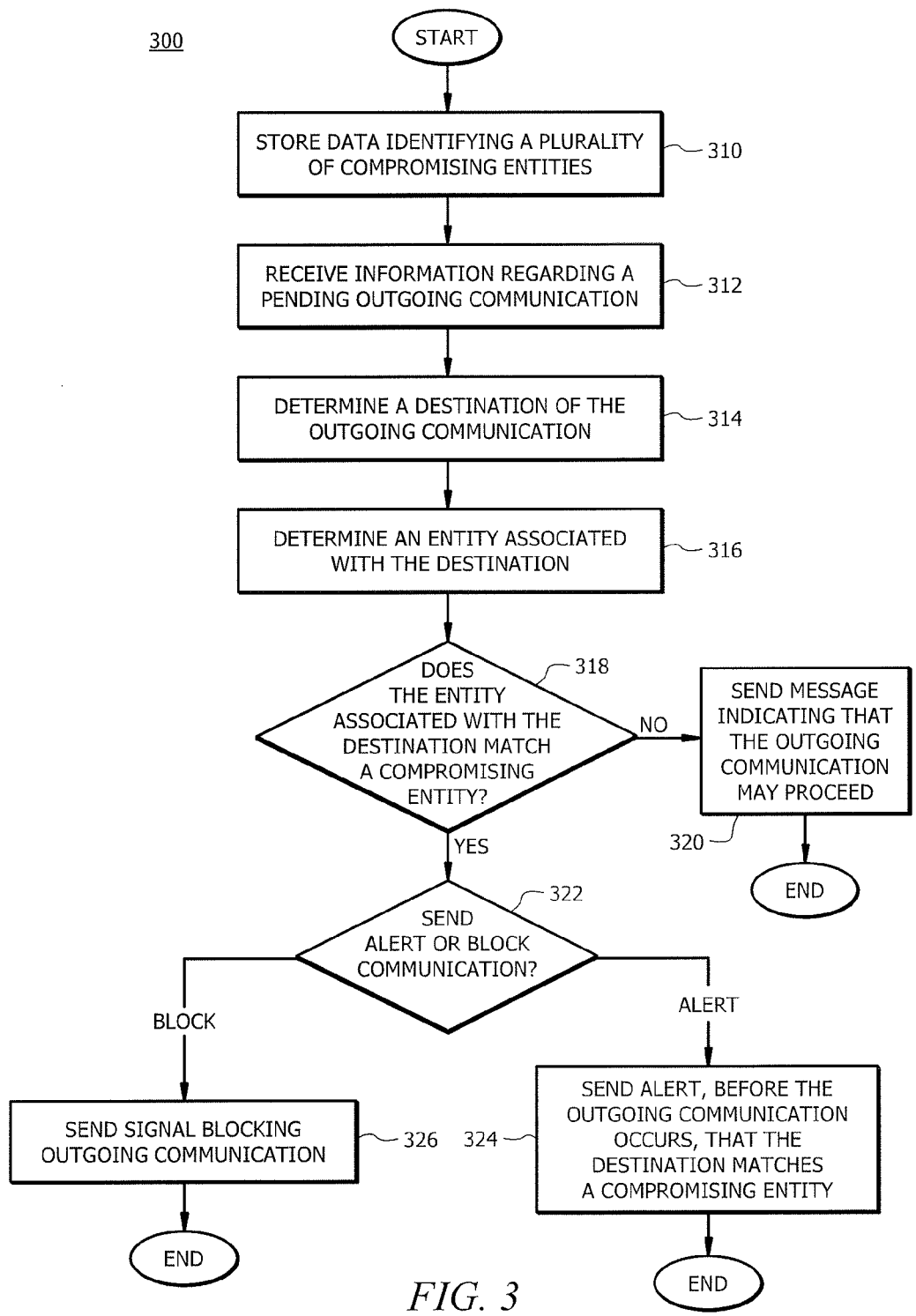
FIG. 3 illustrates a flowchart of an example method of proactive intrusion protection against outgoing communications from a remote device, which may be used, for example, in the system illustrated in FIG. 1.

FIG. 3 illustrates a flowchart of an example method 300 of proactive intrusion protection against outgoing communications 168 from a remote device (e.g., mobile device 110), according to a particular embodiment. In certain embodiments, some or all of the steps of method 300 may be performed by components of system 100 illustrated in FIG. 1 (for example, server 130 and/or application 116). Some or all of the steps of method 300 may be used in conjunction with some or all of the steps of methods 400, 500, and/or 600.

Method 300 begins at step 310. At step 310, data is stored that identifies a plurality of compromising entities 160 (e.g., list of compromised devices 136 and/or list of contacts deemed unsafe 138). A system, for example components of system 100 (such as server 130), may perform this step. In some embodiments, the data may comprise outgoing communication information 170 and/or destination information 170. In certain embodiments, the data may be received from data sources 150. In some embodiments, the data may comprise some or all of the data comprising data table 200. The data may comprise a phone number, physical and/or virtual destination, a particular physical or virtual machine or device, a particular MAC address, international mobile station equipment identities (IMEI), or IP address, and/or any other relevant identifier. In example embodiments, the data may comprise an identifier of an entity associated with the destination, for instance a name, screen name, address, organization name, zip code, phone number, voice biometrics, geographic source or destination (e.g. a country, city, or other geographical area), and/or any other relevant identifier.

At step 312, information is received regarding a pending outgoing communication (e.g., outgoing communication 168). In certain embodiments, the information regarding the outgoing communication may comprise a destination of the outgoing communication. In particular embodiments, the information may comprise outgoing communication information 170 and/or destination information 172. The information may be received from an application (e.g., application 116) associated with a remote device (e.g., mobile device 110) and/or with an intrusion protection system, which may include, for example, components of system 100. In particular embodiments, the information may be in electronic form. The electronic information may be in the form of a proprietary protocol associated with the application and/or the intrusion protection system. The electronic information may be received (e.g., from the application) in a secure manner, such that, for example, other users and devices connected to network 120 cannot access the information (or would have difficulty accessing the information). In some embodiments, the information may be received by an institution associated with the application and/or by an intrusion protection system associated with the application and/or institution. In certain embodiments, the information may be received by a server, such as server 130, or to some other component of an intrusion protection system.

At step 314, a destination of the outgoing communication (e.g., outgoing communication 168) is determined. In some embodiments, the destination of the outgoing communication may be determined, based at least in part, on the information received regarding a pending outgoing communication (e.g., outgoing communication information 170 and/or destination information 172). Such information may be received, for example, from an application such as application 116 on a remote device such as mobile device 110. In certain embodiments, the destination of the outgoing communication may comprise a phone number, physical and/or virtual destination, a particular physical or virtual machine or device, a particular MAC address, international mobile station equipment identities (IMEI), or IP address, and/or any other relevant identifier. In some embodiments, the destination may comprise an identifier of an entity associated with the destination, for instance a name, screen name, address, organization name, zip code, phone number, voice biometrics, geographic source or destination (e.g. a country, city, or other geographical area), and/or any other relevant identifier.

At step 316, an entity associated with the destination is determined. In some embodiments, this determination may be performed by a processor associated with an intrusion protection system, for example components of system 100 (e.g., processor 132, processor 112, and/or application 116). In certain embodiments, the entity associated with the destination of the outgoing communication may be determined by comparing the determined destination (or data regarding the destination) with data identifying any of the plurality of compromising entities (e.g., compromising entities 160). For example, data regarding the destination (e.g., outgoing communication information 170, destination information 172, and/or information regarding contacts stored on mobile device 110) contained in data storage 134, 114 and/or from data sources 150 may be compared with a list of compromised devices 136 and/or a list of contacts deemed unsafe 138, and/or any other data associated with compromising entities (e.g., data from data sources 150 and/or data table 200). An entity associated with the destination may be determined by analyzing data for an association or match between the destination and data associated with a compromising entity 160. In other embodiments, an entity associated with the destination may be determined by analyzing data for an association or match between the destination and data associated with a non-compromising or "safe" or "trusted" entity (e.g., safe entities 140).

In particular embodiments, the entity may be determined by accessing, comparing, and/or transforming data present on the remote device. For example, a list of contacts, email addresses, phone numbers, or any other data stored on a remote device, such as data storage 114 of mobile device 110 may be used to determine the entity associated with the destination. Outgoing communication information 170 and/or destination information 172 may be used in certain circumstances. In other embodiments, other data stored by or on components of the intrusion protection system may be used to determine the entity associated with the destination. For example, data storage 134 and/or data storage 114 may also have data corresponding to various entities that are not necessarily compromised or compromising. For example, data storage 134 and/or data storage 114 may comprise "safe lists" 140 (also known as "trusted lists"), which may also contain other information indicating that particular entities and/or destinations are not a threat.

At step 318, it is determined whether the entity associated with the destination matches, or is associated with, one of the plurality of compromising entities (e.g., compromising entities 160). If the destination does not match, or show an association with, one of the plurality of compromising entities, then method 300 continues to step 320. If the destination does match, or is associated with, one of the plurality of compromising entities, then method 300 continues to step 322. In certain embodiments, the determination of step 318 may be performed by components of an intrusion protection system, such as system 100, and as a further example, processors 132, 112 and/or application 116.

At step 320, a message is sent indicating that the outgoing communication (e.g., outgoing communication 168) may proceed. In certain embodiments, the message may be sent to an application associated with the intrusion protection system (e.g., application 116), which may be running and/or located on remote device (e.g., mobile device 110). In some embodiments, the message may comprise, be sent with, or cause an alert or other notification. For example, the message may be sent with an alert (e.g. alert 144) to an application on a remote device. In particular embodiments, the outgoing communication proceeds if no message to the contrary is sent or if the remote device is not instructed to block the outgoing communication (or otherwise pause, suspend, quarantine, or hold the communication) after a certain period of time. The period of time, or delay, may be set by components of the intrusion protection system, such as components of system 100. For example, server 130 may receive instructions regarding the period of time from application 116, from a user interacting with application 116. As another example, server 130 may use a rules engine 142 or other settings to determine the period of time.

At step 322, it is determined whether to send a message comprising or causing (1) an alert (e.g. alert 144) or (2) a signal to block (e.g., signal to block 146) the outgoing communication. If it is determined that an alert will be sent, method 300 continues to step 324. If it is determined that a signal to block the outgoing communication will be sent, method 300 continues to step 326. In certain embodiments, it may be determined that the message will comprise a signal to block other communications in addition to, or instead of, the outgoing communication. In some embodiments, the message may instruct the application to create and/or display an alert. In some embodiments, the message may instruct the application to create and/or transmit a signal to block the outgoing communication or any other communication. Additionally, the determination of step 322 may be made by components of an intrusion protection system, such as components system 100. For example, processors 132 and 112, and/or application 116, may determine whether to send or propagate an alert (e.g., alert 144) or blocking message (e.g., signal to block 146), based on, for example, a rules engine 142 or other criteria stored on a component associated with the intrusion protection system (e.g., data storage 114, data storage 134, and/or data sources 150). As an example, the rules engine 142 may be used to dictate that an alert and/or signal to block will be sent in certain situations, such as when geographic conditions are met (e.g., the intrusions at issue are occurring in a particular geographic area), when the affected mobile device is of a particular type or upgrade version, at particular days and/or times, when the intrusion risk is applicable to commercial versus personal or individual users or devices, etc.

At step 324, a message comprising an alert (e.g., alert 144) is sent. In particular embodiments, the alert is sent before the outgoing communication is sent. In certain embodiments, the alert comprises data sufficient to inform a remote device (e.g., mobile device 110) and/or an application associated with the remote device (e.g., application 116) that the destination of the outgoing communication matches a compromising entity (e.g., compromising entity 160). In example embodiments, the alert may be configured to cause the remote device and/or the application associated with the remote device to display the alert on the remote device or another device. In further embodiments, the alert may be configured to be displayed to the user of the remote device and/or the application. In other embodiments, the alert may be configured to display certain information (or cause the application to display certain information), such as some or all of the information contained in data table 200 and/or that the destination of the outgoing communication matches a compromising entity (e.g., compromising entity 160). The alert may be configured to give the user the option to block some or all communication with any compromising entity associated with the alert. The alert may further be configured to allow the user to have the option to terminate the outgoing communication. In particular embodiments, the alert may be configured to cause the application and/or remote device to pause, suspend, quarantine, or otherwise hold the outgoing communication until or unless the user indicates that the outgoing communication should proceed.

At step 326, a message comprising a signal (e.g., signal to block 146) is sent that blocks the outgoing communication or causes the outgoing communication (e.g., outgoing communication 168) to be blocked. In certain embodiments, the signal may be configured to cause the application to block the outgoing communication. In particular embodiments, the signal itself may be configured to disable or otherwise block the outgoing communication. The signal may also be configured to block, or cause to be blocked, communications other than just the outgoing communication, for example, every communication from the application (e.g., application 116) or the remote device running the application (e.g., mobile device 110). This may happen, for example, if the remote device is physically obtained or remotely controlled by a compromising entity (e.g., compromising entity 160). The signal may be configured to block on such a larger-scale, for example, if it is determined that an unauthorized user (such as a compromising entity 160) has accessed the application and/or the remote device running the application. In such instances, the signal may be configured to block all communications to and/or from the remote device. In addition, the signal may be configured to limit features of the remote device (e.g., texting, telephone, email, certain applications, etc. may be disabled, or information may only be sent to existing contacts present on the remote device, not contacts entered after the signal is sent). The signal may also be configured to track the remote device, for example via phone number, IP or MAC address, IMEI, etc. Once the remote device, now a compromised device itself, is tracked, server 130 and/or other components of intrusion protection system 100 may remove its ability to access networks associated with certain institutions (e.g., a bank associated with intrusion protection system 100). As an additional example, a user may request a blocking signal be sent to the remote device, for example if the user misplaces his remote device or if he wants to prevent minors from sending/receiving money from unknown sources. In such instances, the blocking signal may, for example, prevent communications (e.g. incoming communications 162 and/or outgoing communications 168) constituting some or all monetary transactions, but not necessarily standard telephone calls, email, social media usage, etc.

In certain embodiments, the signal may be configured to require, or cause the application or device to require, a user to enter a passcode or otherwise verify his identity (to the application, a device running the application, and/or an institution associated with the application) before some or all communications are unblocked. In particular embodiments, an alert (e.g., alert 144), such as the types of alerts described in step 324, may accompany the signal to block (e.g. signal to block 146) any communications. In certain situations, any blocking signal may be part of or accompany any alert.

In particular embodiments of method 300, a user, a system, and/or component of a system, such as system 100, may perform all steps, any step, or any part of a step. In addition, a user, system, and/or component of a system may cause an application to perform all steps, any step, or any part of a step. Some, all, or part of the steps of method 300 may be used in conjunction with some, all, or part of the steps of methods 400, 500, and/or 600. In certain embodiments of method 300, a proactive intrusion protection process could comprise some or all steps of method 300, either in the order and arrangement described or not. In particular embodiments of method 300, some or all steps of method 300 may be partially or fully applicable to both outgoing communications (where the destination may be determined to be associated with a compromising entity) and incoming communications (where the source may be determined to be associated with a compromising entity).

The steps of method 300 are given as example combinations of steps for proactive intrusion protection, including example steps of executing proactive intrusion protection. Some of the steps may be performed in a different order, omitted, or repeated where appropriate. Additionally, one of skill in the art will recognize other combinations of steps, including additional steps, are possible without departing from the scope of the present disclosure.

Figure 4:
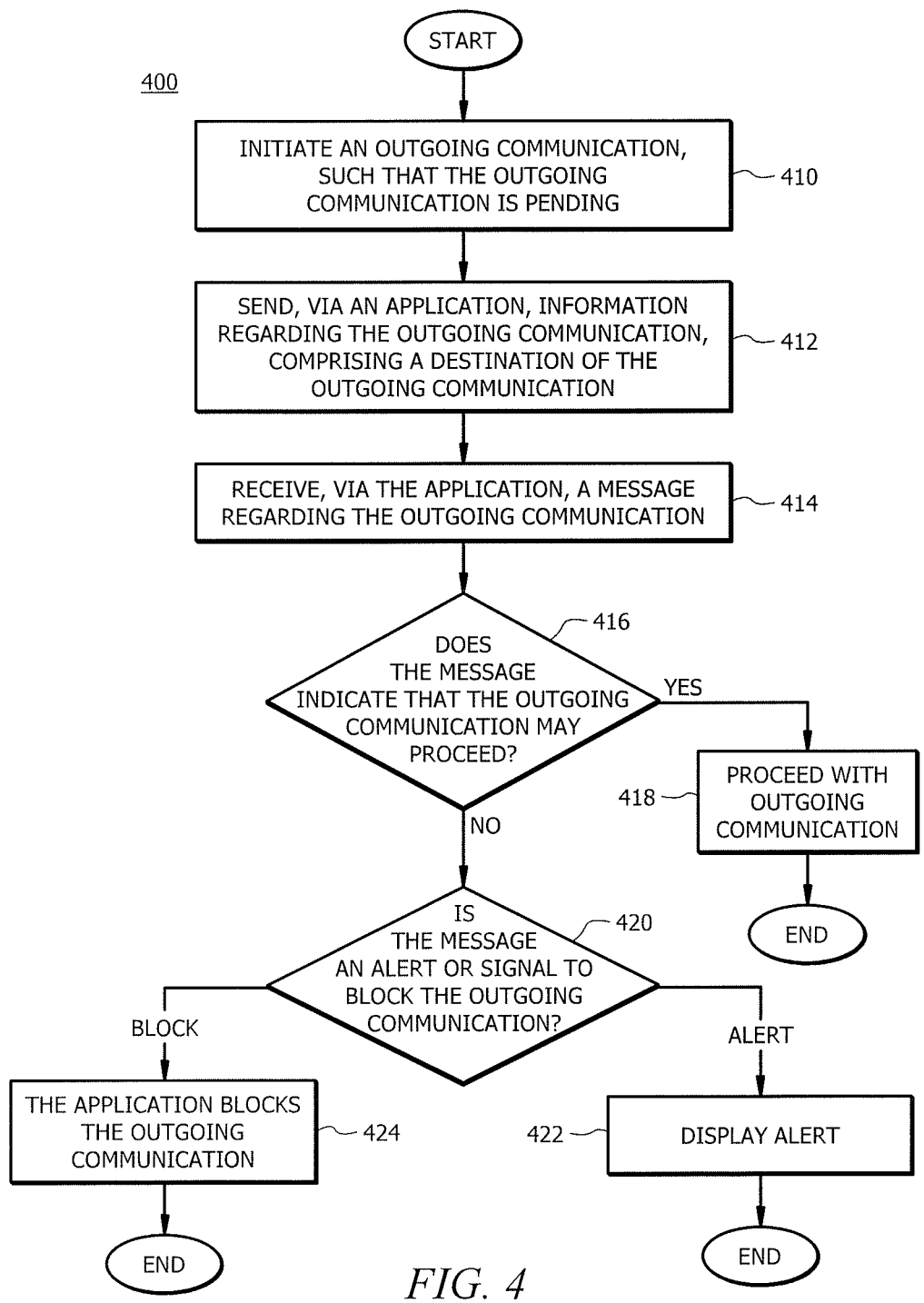
FIG. 4 illustrates a flowchart of another example method of proactive intrusion protection against outgoing communications from a remote device, which may be used, for example, in the system illustrated in FIG. 1.

FIG. 4 illustrates a flowchart of another example method 400 of proactive intrusion protection against outgoing communications 168 from a remote device (e.g., mobile device 110), according to a particular embodiment. In certain embodiments, some or all of the steps of method 400 may be performed by components of system 100 illustrated in FIG. 1 (for example, application 116 and/or server 130). Some or all of the steps of method 400 may be used in conjunction with some or all of the steps of methods 300, 500, and/or 600.

Method 400 begins at step 410. At step 410, an outgoing communication (e.g., outgoing communication 168) is initiated such that the outgoing communication is pending. The outgoing communication may be any type of electronic communication, including, for example, a telephone call, SMS, MMS, email, interaction with a web page on the Internet, communication via a proprietary protocol or service (e.g., a message specific to a particular application), a transaction or transaction request, etc. In particular embodiments, a user may initiate the outgoing communication on his remote device, such as mobile device 110. In further embodiments, the outgoing communication may be initiated over an application (for example, application 116) associated with an intrusion protection system, such as components of system 100. In other embodiments, the outgoing communication may be initiated on a remote device running an application (for example, application 116) associated with an intrusion protection system.

At step 412, information regarding the outgoing communication (e.g., outgoing communication 168), comprising a destination of the outgoing communication, is sent via an application. In particular embodiments, the information may comprise outgoing communication information 170 and/or destination information 172. The information may be in electronic form. The electronic information may be in the form of a proprietary protocol associated with the application and/or the intrusion protection system. The electronic information may be sent via the application in a secure manner, such that, for example, some or all of any other applications on a remote device (e.g., mobile device 110) running the application cannot access the information (or would have difficulty accessing the information). In some embodiments, the information may be sent to an institution associated with the application and/or to components of an intrusion protection system associated with the application and/or institution. In certain embodiments, the information may be sent to a server, such as server 130, or to some other component of an intrusion protection system.

In some embodiments, the destination of the outgoing communication may comprise a phone number, physical and/or virtual destination, a particular physical or virtual machine or device, a particular MAC address, international mobile station equipment identities (IMEI), or IP address, and/or any other relevant identifier. In some embodiments, the destination may comprise an identifier of an entity associated with the destination, for instance a name, screen name, address, organization name, zip code, phone number, voice biometrics, geographic source or destination (e.g. a country, city, or other geographical area), and/or any other relevant identifier.

At step 414, a message regarding the outgoing communication is received via the application. In particular embodiments, the message may be an electronic message. The electronic message may be in the form of a proprietary protocol associated with the application and/or the intrusion protection system. The electronic message may be received via the application in a secure manner, such that, for example, some or all of any other applications on a remote device (e.g., mobile device 110) running the application cannot access the message (or would have difficulty accessing the message). In some embodiments, the message may be received from an institution associated with the application and/or from a component of an intrusion protection system associated with the application. In certain embodiments, the message may be received from a server, such as server 130, or from some other component of an intrusion protection system.

At step 416, it is determined whether the message indicates that the outgoing communication (e.g., outgoing communication 168) may proceed. If it is determined that the outgoing communication may proceed, method 400 continues to step 418. If it is determined that the outgoing communication may not proceed, method 400 continues to step 420. In certain embodiments, the application analyzes the message to determine whether or not the outgoing communication may proceed. In certain embodiments, the determination of step 416 may be performed by components of an intrusion protection system, such as system 100, and as a further example, processors 132, 112 and/or application 116.

At step 418, the outgoing communication (e.g. outgoing communication 168) proceeds. In certain embodiments, a user of the application may be notified that the outgoing communication may proceed. In some embodiments, the outgoing communication proceeds if no message to the contrary is received or if the remote device is not instructed to block the outgoing communication (or otherwise pause, suspend, quarantine, or hold the communication) after a certain period of time. The period of time may be set by the user and/or the application in certain embodiments. For example, the period of time, or delay, may be set by components of the intrusion protection system, such as components of system 100. For example, application 116 may receive instructions regarding the period of time from server 130 or from a user interacting with application 116. As another example, application 116 may use a rules engine 117 or other settings to determine the period of time.

At step 420, it is determined whether the message is an alert (e.g., alert 144) or a signal to block (e.g., signal to block 146) the outgoing communication. If it is determined that the message is an alert, method 400 continues to step 422. If it is determined that the message is a signal to block the outgoing communication, method 400 continues to step 424. In certain embodiments, the message may be a signal to block other communications in addition to, or instead of, the outgoing communication. In some embodiments, the message may instruct the application to create and/or display an alert. In some embodiments, the message may instruct the application to create and/or transmit a signal to block the outgoing communication or any other communication. Additionally, the determination of step 420 may be made by components of an intrusion protection system, such as components system 100. For example, processors 132 and 112, and/or application 116, may determine whether to send or propagate an alert or blocking message, based on, for example, a rules engines 117 and 142 or other criteria stored on a component associated with the intrusion protection system (e.g., data storage 114, data storage 134, and/or data sources 150). As an example, the rules engine 117 may be used to dictate that an alert and/or signal to block will be sent in certain situations, such as when geographic conditions are met (e.g., the intrusions at issue are occurring in a particular geographic area), when the affected mobile device is of a particular type or upgrade version, at particular days and/or times, when the intrusion risk is applicable to commercial versus personal or individual users or devices, etc.

At step 422, the alert is displayed. In some circumstances, the alert may be alert 144 and/or may be generated by an application associated with a remote device (e.g., application 116). In particular embodiments, the alert is displayed on a remote device running the application. In some example embodiments, the alert may be displayed and/or received before the outgoing communication is sent. In further embodiments, the alert may be displayed to the user of the remote device and/or the application. In other embodiments, the alert may display certain information, such as some or all of the information contained in data table 200 and/or that the destination of the outgoing communication (e.g., outgoing communication 168) matches a compromising entity (e.g., compromising entity 160). The user may also have the option to block some or all communication with any compromising entity associated with the alert. The user may also have the option to terminate the outgoing communication. In particular embodiments, the alert, or the application in response to receiving the alert, may pause, suspend, quarantine, or otherwise hold the outgoing communication until or unless the user indicates that the outgoing communication should proceed.

At step 424, the outgoing communication (e.g., outgoing communication 168) is blocked. In certain embodiments, the application may block the outgoing communication, which may occur in response to receiving the signal to block (e.g., signal to block 146). In particular embodiments, the signal itself may be configured to disable or otherwise block the outgoing communication. The signal may also be configured to block, or cause to be blocked, communications other than just the outgoing communication, for example, every communication from the application (e.g., application 116) or the remote device running the application (e.g., mobile device 110). This may happen, for example, if the remote device is physically obtained or remotely controlled by a compromising entity (e.g., compromising entity 160). The signal may be configured to block on such a larger-scale, for example, if it is determined that an unauthorized user (such as a compromising entity 160) has accessed the application and/or the remote device running the application. In such instances, the signal may be configured to block all communications to and/or from the remote device. In addition, the signal may be configured to limit features of the remote device (e.g., texting, telephone, email, certain applications, etc. may be disabled, or information may only be sent to existing contacts present on the remote device, not contacts entered after the signal is sent). The signal may also be configured to track the remote device, for example via phone number, IP or MAC address, IMEI, etc. Once the remote device, now a compromised device itself, is tracked, server 130 and/or other components of intrusion protection system 100 may remove its ability to access networks associated with certain institutions (e.g., a bank associated with intrusion protection system 100). As an additional example, a user may request a blocking signal be sent to the remote device, for example if the user misplaces his remote device or if he wants to prevent minors from sending/receiving money from unknown sources. In such instances, the blocking signal may, for example, prevent communications (e.g. incoming communications 162 and/or outgoing communications 168) constituting some or all monetary transactions, but not necessarily standard telephone calls, email, social media usage, etc.

In certain embodiments, a user may need to enter a passcode or otherwise verify his identity (to the application, a device running the application, and/or an institution associated with the application) before some or all communications are unblocked. In particular embodiments, an alert (e.g., alert 144), such as the types of alerts described in step 422, may accompany the signal to block (e.g., 146) any communications. In certain situations, any blocking signal may be part of or accompany any alert.

In particular embodiments of method 400, a user, a system, and/or component of a system, such as system 100, may perform all steps, any step, or any part of a step. In addition, a user, system, and/or component of a system may cause an application to perform all steps, any step, or any part of a step. Some, all, or part of the steps of method 400 may be used in conjunction with some, all, or part of the steps of methods 300, 500, and/or 600. In certain embodiments of method 400, a proactive intrusion protection process could comprise some or all steps of method 400, either in the order and arrangement described or not. In particular embodiments of method 400, some or all steps of method 400 may be partially or fully applicable to both outgoing communications (where the destination may be determined to be associated with a compromising entity) and incoming communications (where the source may be determined to be associated with a compromising entity).

The steps of method 400 are given as example combinations of steps for proactive intrusion protection, including example steps of executing proactive intrusion protection. Some of the steps may be performed in a different order, omitted, or repeated where appropriate. Additionally, one of skill in the art will recognize other combinations of steps, including additional steps, are possible without departing from the scope of the present disclosure.

FIG. 5 illustrates a flowchart of an example method 500 of proactive intrusion protection against incoming communications 162 from a remote device (e.g., mobile device 110), according to a particular embodiment. In certain embodiments, some or all of the steps of method 500 may be performed by components of system 100 illustrated in FIG. 1 (for example, server 130 and/or application 116). Some or all of the steps of method 500 may be used in conjunction with some or all of the steps of methods 300, 400, and/or 600.

Method 500 begins at step 510. At step 510, data is stored that identifies a plurality of compromising entities 160 (e.g., list of compromised devices 136 and/or list of contacts deemed unsafe 138). Step 510 is analogous to step 310 of method 300. In certain embodiments, the data may comprise incoming communication information 164 and/or source information 166.

At step 512, information is received regarding an incoming communication (e.g., incoming communication 162). Step 512 is analogous to step 312, but focuses on incoming communications and/or sources of such incoming communications as opposed to outgoing communications and/or destinations of such outgoing communications. In particular embodiments, the information may comprise incoming communication information 164 and/or source information 166.

At step 514, a source of the incoming communication (e.g., incoming communication 162) is determined. Step 514 is analogous to step 314, but focuses on incoming communications and/or sources of such incoming communications as opposed to outgoing communications and/or destinations of such outgoing communications. In some embodiments, the source may be determined, based at least in part, on the information received regarding an incoming communication (e.g., incoming communication information 164 and/or source information 166).

At step 516, an entity associated with the source is determined. Step 516 is analogous to step 316, but focuses on incoming communications and/or sources of such incoming communications as opposed to outgoing communications and/or destinations of such outgoing communications.

Incoming communication information 164 and/or source information 166 may be used to determine the source and/or an entity associated with the source. For example, data regarding the source (e.g., incoming communication information 164, source information 166, and/or information regarding contacts stored on mobile device 110) contained in data storage 134, 114 and/or from data sources 150 may be compared with a list of compromised devices 136 and/or a list of contacts deemed unsafe 138, and/or any other data associated with compromising entities (e.g., data from data sources 150 and/or data table 200).

At step 518, it is determined whether the entity associated with the source matches, or is associated with, one of the plurality of compromising entities (e.g., compromising entities 160). If the source does not match, or show an association with, one of the plurality of compromising entities, then method 500 continues to step 520. If the source does match, or is associated with, one of the plurality of compromising entities, then method 500 continues to step 522. Step 518 is analogous to step 318, but focuses on incoming communications and/or sources of such incoming communications as opposed to outgoing communications and/or destinations of such outgoing communications.

At step 520, a message is sent indicating that the incoming communication (e.g., incoming communication 162) may proceed. Step 520 is analogous to step 320, but focuses on incoming communications and/or sources of such incoming communications as opposed to outgoing communications and/or destinations of such outgoing communications.

At step 522, it is determined whether to send a message comprising or causing (1) an alert (e.g. alert 144) or (2) a signal to block (e.g., signal to block 146) the incoming communication. If it is determined that an alert will be sent, method 500 continues to step 524. If it is determined that a signal to block the incoming communication will be sent, method 500 continues to step 526. Step 522 is analogous to step 322, but focuses on incoming communications and/or sources of such incoming communications as opposed to outgoing communications and/or destinations of such outgoing communications.

At step 524, a message comprising an alert (e.g., alert 144) is sent. Step 524 is analogous to step 324, but focuses on incoming communications and/or sources of such incoming communications as opposed to outgoing communications and/or destinations of such outgoing communications. In certain embodiments, the alert may not be sent before the incoming communication is sent, as a remote device (such as mobile device 110) may need to receive the incoming communication before an alert can be generated and/or sent.

At step 526, a message comprising a signal (e.g., signal to block 146) is sent that blocks the incoming communication or causes the incoming communication (e.g., incoming communication 162) to be blocked. Step 526 is analogous to step 326, but focuses on incoming communications and/or sources of such incoming communications as opposed to outgoing communications and/or destinations of such outgoing communications. In certain embodiments, "blocking" the incoming communication may comprise quarantining the incoming communication until a further action (such as allowing or terminating the incoming communication) is determined or chosen by a user of the remote device. In other embodiments, the incoming communication may be "blocked" by terminating the incoming communication, automatically or otherwise.

In particular embodiments of method 500, a user, a system, and/or component of a system, such as system 100, may perform all steps, any step, or any part of a step. In addition, a user, system, and/or component of a system may cause an application to perform all steps, any step, or any part of a step. Some, all, or part of the steps of method 500 may be used in conjunction with some, all, or part of the steps of methods 300, 400, and/or 600. In certain embodiments of method 500, a proactive intrusion protection process could comprise some or all steps of method 500, either in the order and arrangement described or not. In particular embodiments of method 500, some or all steps of method 500 may be partially or fully applicable to both outgoing communications (where the destination may be determined to be associated with a compromising entity) and incoming communications (where the source may be determined to be associated with a compromising entity).

The steps of method 500 are given as example combinations of steps for proactive intrusion protection, including example steps of executing proactive intrusion protection. Some of the steps may be performed in a different order, omitted, or repeated where appropriate. Additionally, one of skill in the art will recognize other combinations of steps, including additional steps, are possible without departing from the scope of the present disclosure.

FIG. 6 illustrates a flowchart of another example method 600 of proactive intrusion protection against incoming communications 162 from a remote device (e.g., mobile device 110), according to a particular embodiment. In certain embodiments, some or all of the steps of method 600 may be performed by components of system 100 illustrated in FIG. 1 (for example, application 116 and/or server 130). Some or all of the steps of method 600 may be used in conjunction with some or all of the steps of methods 300, 400, and/or 500.

Method 600 begins at step 610. At step 610, an incoming communication (e.g., incoming communication 162) is received. Step 610 is analogous to step 410, but focuses on incoming communications and/or sources of such incoming communications as opposed to outgoing communications and/or destinations of such outgoing communications.

At step 612, information regarding the incoming communication, comprising a source of the incoming communication, is sent via an application. Step 612 is analogous to step 412, but focuses on incoming communications and/or sources of such incoming communications as opposed to outgoing communications and/or destinations of such outgoing communications. In certain embodiments, the information may comprise incoming communication information 164 and/or source information 166.

At step 614, a message regarding the incoming communication (e.g., incoming communication 162) is received via the application. Step 614 is analogous to step 414, but focuses on incoming communications and/or sources of such incoming communications as opposed to outgoing communications and/or destinations of such outgoing communications.

At step 616, it is determined whether the message indicates that the incoming communication (e.g., incoming communication 162) may proceed. If it is determined that the incoming communication may proceed, method 600 continues to step 618. If it is determined that the incoming communication may not proceed, method 600 continues to step 620. Step 616 is analogous to step 416, but focuses on incoming communications and/or sources of such incoming communications as opposed to outgoing communications and/or destinations of such outgoing communications.

At step 618, the incoming communication proceeds. Step 618 is analogous to step 418, but focuses on incoming communications and/or sources of such incoming communications as opposed to outgoing communications and/or destinations of such outgoing communications.

At step 620, it is determined whether the message is an alert (e.g., alert 144) or a signal to block (e.g., signal to block 146) the incoming communication. If it is determined that the message is an alert, method 600 continues to step 622. If it is determined that the message is a signal to block the incoming communication, method 600 continues to step 624. Step 620 is analogous to step 420, but focuses on incoming communications and/or sources of such incoming communications as opposed to outgoing communications and/or destinations of such outgoing communications.

At step 622, the alert is displayed. In certain embodiments, the alert may be sent from another component of an intrusion protection system (e.g., alert 144) or the alert may be generated by a remote device, such as mobile device 110. Step 622 is analogous to step 422, but focuses on incoming communications and/or sources of such incoming communications as opposed to outgoing communications and/or destinations of such outgoing communications. In certain embodiments, the alert may not be displayed before the incoming communication is sent, as a remote device (such as mobile device 110) may need to receive the incoming communication before an alert can be generated and/or sent.

At step 624, the incoming communication (e.g., incoming communication 162) is blocked. Step 624 is analogous to step 624, but focuses on incoming communications and/or sources of such incoming communications as opposed to outgoing communications and/or destinations of such outgoing communications. In certain embodiments, "blocking" the incoming communication may comprise quarantining the incoming communication until a further action (such as allowing or terminating the incoming communication) is determined or chosen by a user of the remote device. In other embodiments, the incoming communication may be "blocked" by terminating the incoming communication, automatically or otherwise.

In particular embodiments of method 600, a user, a system, and/or component of a system, such as system 100, may perform all steps, any step, or any part of a step. In addition, a user, system, and/or component of a system may cause an application to perform all steps, any step, or any part of a step. Some, all, or part of the steps of method 600 may be used in conjunction with some, all, or part of the steps of methods 300, 400, and/or 500. In certain embodiments of method 600, a proactive intrusion protection process could comprise some or all steps of method 600, either in the order and arrangement described or not. In particular embodiments of method 600, some or all steps of method 600 may be partially or fully applicable to both outgoing communications (where the destination may be determined to be associated with a compromising entity) and incoming communications (where the source may be determined to be associated with a compromising entity).

The steps of method 600 are given as example combinations of steps for proactive intrusion protection, including example steps of executing proactive intrusion protection. Some of the steps may be performed in a different order, omitted, or repeated where appropriate. Additionally, one of skill in the art will recognize other combinations of steps, including additional steps, are possible without departing from the scope of the present disclosure.

Certain embodiments of the present disclosure may provide one or more technical advantages. For example, by sending an alert to a remote device before an outgoing communication is sent, e.g., in real time, the system increases the likelihood of preventing a user of the remote device from divulging data to the compromising entity that represents a potential intrusion threat. Similarly, sending an alert regarding incoming communications, which may also occur in real time, increases the likelihood of preventing intrusions. Compared to an institution sending out a general mass warning to users regarding potential intrusion threats, for example via email or SMS, a user using a remote device as described herein is more likely both to notice the security concern pertaining to the incoming and/or outgoing communication and to refrain from sending data to the compromising entity. The effectiveness of the system in preventing communications with compromising entities is further increased in situations where the system sends a signal to the remote device to block the remote device from establishing an outgoing communication with a compromising entity. Similarly, the system may send a signal to the remote device to block or quarantine incoming communications from compromising entities. By increasing the effectiveness of the intrusion protection system, digital telecommunication networks and the devices and hardware connected to them become more secure.

Furthermore, by transforming data regarding compromising entities into alerts and signals sent to the remote devices, the embodiments of the present disclosure may more effectively prevent intrusions into users' accounts, such as online bank accounts or credit accounts.

An additional technical advantage afforded by particular embodiments of the present invention is that intrusion protection can occur over communication channels that are more secure than standard email, SMS, MMS, Internet, etc., which may also increase the authenticity of communications. For example, communications between an application associated with an institution and a server (or other component of an intrusion protection system) can be more secure than other methods of communication. This may allow for intrusion protection data, messages, signals, commands, etc. to be sent between components more securely. As an additional example, communicated data may be transformed to a different format and/or protocol such that the communicated data is more secure. In certain embodiments, the communications between an application and another component may be according to an uncommon, secure, and/or proprietary protocol, further increasing data security and the authenticity of communications. For example, SSL (secure sockets layer) or tokenized communications may be used. Such communications also allow each component of the intrusion protection system to authenticate the incoming communication, which is critical in situations where intrusions may exist, and particularly if a compromising entity may have remote access to a remote device. In some embodiments, direct communication between the application and other components of an intrusion protection system may allow for communications, messages, commands, etc. to be sent to and/or from a remote device in the possession or control of a compromising entity without the compromising entity's knowledge and/or permission.

As yet another example advantage, certain embodiments of the present disclosure may also provide technical advantages to data networks by reducing the amount of network traffic and/or processing demands required to operate intrusion protection systems, and more particularly by reducing the amount of data sent by systems to remote devices. For instance, identifying individual communications with compromising entities and sending alerts or signals to block only those communications reduces network traffic compared to mass alerting all users, or even all users in a certain geographic area.

Other technical advantages of the present disclosure will be readily apparent to one skilled in the art from the following figures, descriptions, and claims. Moreover, while specific advantages have been enumerated above, various embodiments may include all, some, or none of the enumerated advantages.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. §112(f) as it exists on the date of filing hereof unless the words "means for" or "step for" are explicitly used in the particular claim.

The invention claimed is:

1. A system, comprising:
a memory operable to store:
data identifying a plurality of compromising entities, where the data comprises at least one of a device identifier or a contact identifier; and
a processor communicatively coupled to the memory and operable to:
receive, from a remote application associated with a remote device and with the system, information regarding an incoming communication, where the information comprises information regarding a source of the incoming communication;
determine an entity associated with the source of the incoming communication by analyzing the information regarding the incoming communication;
determine that the entity associated with the source of the incoming communication matches at least one of the plurality of compromising entities based, at least in part, on comparing:
the data identifying the plurality of compromising entities; and
the entity associated with the source of the incoming communication; and
send, to the remote application associated with the system, a signal configured to block the incoming communication;
a rules engine, where a rule of the rules engine must be satisfied before the signal may be sent; and
wherein the processor is further operable to:
determine that a rule associated with the rules engine applies, where the rule holds that only signals associated with threats above a threshold level of severity may be sent; and
determine that the signal is associated with a threat above the threshold level of severity.

2. The system of claim 1, wherein the processor is further operable to:
receive, from the remote application associated with the remote device and with the system, information regarding a pending outgoing communication, where the information comprises information regarding a destination of the outgoing communication;
determine an entity associated with the destination of the outgoing communication by analyzing the information regarding the outgoing communication;
determine that the entity associated with the destination of the outgoing communication matches at least one of the plurality of compromising entities based, at least in part, on comparing:
the data identifying the plurality of compromising entities; and
the entity associated with the destination of the outgoing communication; and
send, to the remote application associated with the system, and before the outgoing communication is sent, a second signal configured to block the outgoing communication.

3. The system of claim 1, wherein the signal is sent as part of a communication formatted to be protected by at least one of SSL (secure sockets layer) and tokenization.

4. The system of claim 1, wherein the processor receives an authentication message confirming that the signal was received by a legitimate application.

5. The system of claim 1, wherein:
at least some of the information regarding the source of the incoming communication comprises a phone number; and
the entity associated with the source of the incoming communication is determined, based at least in part, on comparing:
the phone number; and
the data identifying a plurality of compromising entities, where the data comprises a plurality of phone numbers.

6. The system of claim 1, wherein the signal comprises instructions for the remote application to block the incoming communication.

7. A system, comprising:
a memory operable to store:
data identifying a plurality of compromising entities, where the data comprises at least one of a device identifier or a contact identifier; and
a processor communicatively coupled to the memory and operable to:
receive, from a remote application associated with a remote device and with the system, information regarding an incoming communication, where the information comprises information regarding a source of the incoming communication;
determine an entity associated with the source of the incoming communication by analyzing the information regarding the incoming communication;
determine that the entity associated with the source of the incoming communication matches at least one of the plurality of compromising entities based, at least in part, on comparing:
the data identifying the plurality of compromising entities; and
the entity associated with the source of the incoming communication; and
send, to the remote application associated with the system, an alert indicating that the source of the incoming communication matches a compromising entity;

a rules engine, where a rule of the rules engine must be satisfied before the alert may be sent; and wherein the processor is further operable to:
determine that a rule associated with the rules engine applies, where the rule holds that only alerts associated with threats above a threshold level of severity may be sent; and
determine that the alert is associated with a threat above the threshold level of severity.

8. The system of claim 7, wherein the processor is further operable to:
receive, from the remote application associated with the remote device and with the system, information regarding a pending outgoing communication, where the information comprises information regarding a destination of the outgoing communication;
determine an entity associated with the destination of the outgoing communication by analyzing the information regarding the outgoing communication;
determine that the entity associated with the destination of the outgoing communication matches at least one of the plurality of compromising entities based, at least in part, on comparing:
the data identifying the plurality of compromising entities; and
the entity associated with the destination of the outgoing communication; and
send, to the remote application associated with the system, and before the outgoing communication is sent, a second alert indicating that the destination of the outgoing communication matches a compromising entity.

9. The system of claim 7, wherein the alert is sent as part of a communication formatted to be protected by at least one of one of SSL (secure sockets layer) and tokenization.

10. The system of claim 7, wherein the processor receives an authentication message confirming that the alert was received by a legitimate application.

11. The system of claim 7, wherein:
at least some of the information regarding the source of the incoming communication comprises a phone number; and
the entity associated with the source of the incoming communication is determined, based at least in part, on comparing:
the phone number; and
the data identifying a plurality of compromising entities, where the data comprises a plurality of phone numbers.

12. The system of claim 7, wherein the alert comprises instructions for the remote application to generate a second alert on the remote device.

13. A method, comprising:
storing data identifying a plurality of compromising entities, where the data comprises at least one of a device identifier or a contact identifier;
receiving, from a remote application associated with a remote device, information regarding an incoming communication, where the information comprises information regarding a source of the incoming communication;
determining an entity associated with the source of the incoming communication by analyzing the information regarding the incoming communication;
determining that the entity associated with the source of the incoming communication matches at least one of the plurality of compromising entities based, at least in part, on comparing:
the data identifying the plurality of compromising entities; and
the entity associated with the source of the incoming communication;
sending to the remote application associated with the remote device, a signal configured to block the incoming communication;
storing a rules engine, where a rule of the rules engine must be satisfied before the signal may be sent;
determining that a rule associated with the rules engine applies, where the rule holds that only signals associated with threats above a threshold level of severity may be sent; and
determining that the signal is associated with a threat above the threshold level of severity.

14. The method of claim 13, further comprising:
receiving, from the remote application associated with the remote device, information regarding a pending outgoing communication, where the information comprises information regarding a destination of the outgoing communication;
determining an entity associated with the destination of the outgoing communication by analyzing the information regarding the outgoing communication;
determining that the entity associated with the destination of the outgoing communication matches at least one of the plurality of compromising entities based, at least in part, on comparing:
the data identifying the plurality of compromising entities; and
the entity associated with the destination of the outgoing communication; and
sending to the remote application associated with the remote device, and before the outgoing communication is sent, a second signal configured to block the outgoing communication.

15. The method of claim 13, wherein the signal is sent as part of a communication formatted to be protected by at least one of one of SSL (secure sockets layer) and tokenization.

16. The method of claim 13, further comprising:
receiving an authentication message confirming that the signal was received by a legitimate application.

17. The method of claim 13, wherein the signal comprises instructions for the remote application to block the incoming communication.

* * * * *